(12) United States Patent
Zmudzinski

(10) Patent No.: US 9,703,720 B2
(45) Date of Patent: Jul. 11, 2017

(54) METHOD AND APPARATUS TO ALLOW SECURE GUEST ACCESS TO EXTENDED PAGE TABLES

(71) Applicant: Intel Corporation, Santa Clara, CA (US)

(72) Inventor: Krystof C. Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 14/581,654

(22) Filed: Dec. 23, 2014

(65) Prior Publication Data

US 2016/0179696 A1    Jun. 23, 2016

(51) Int. Cl.
| | | |
|---|---|---|
| *G06F 12/1009* | (2016.01) | |
| *G06F 12/1036* | (2016.01) | |
| *G06F 12/14* | (2006.01) | |
| *G06F 9/455* | (2006.01) | |

(52) U.S. Cl.
CPC ...... *G06F 12/1009* (2013.01); *G06F 9/45558* (2013.01); *G06F 12/1036* (2013.01); *G06F 12/145* (2013.01); *G06F 2009/45583* (2013.01); *G06F 2212/1052* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 8,209,510 B1 | 6/2012 | Thathapudi et al. | |
| 2006/0206687 A1* | 9/2006 | Vega | G06F 12/10 711/206 |
| 2008/0082772 A1* | 4/2008 | Savagaonkar | G06F 12/145 711/163 |
| 2009/0249019 A1 | 10/2009 | Wu et al. | |

(Continued)

FOREIGN PATENT DOCUMENTS

KR          20130001240 A       1/2013

OTHER PUBLICATIONS

International Search Report and the Written Opinion of the International Searching Authority from counterpart PCT Application No. PCT/US2015/030580, mailed Jul. 29, 2015, 8 pages.

(Continued)

*Primary Examiner* — Adam M Queler
*Assistant Examiner* — Tracy Chan
(74) *Attorney, Agent, or Firm* — Nicholson De Vos Webster & Elliott LLP

(57) ABSTRACT

An apparatus and method for efficient guest EPT manipulation. For example, one embodiment of a apparatus comprises: a hypervisor to create extended page table (EPT) mappings between a guest physical address (GPA) space and a host physical address (HPA) space; the hypervisor to create an EPT edit table and populate the EPT edit table with information related to permitted mappings between the GPA space and HPA space; a guest to read the EPT edit table to determine information related to the permitted mappings between the GPA space and HPA space, the guest to use the information to map one or more pages in the GPA space to one or more pages in the HPA space.

24 Claims, 24 Drawing Sheets

(56) References Cited

U.S. PATENT DOCUMENTS

| | | | |
|---|---|---|---|
| 2012/0255015 A1* | 10/2012 | Sahita | G06F 21/54 |
| | | | 726/24 |
| 2013/0117743 A1* | 5/2013 | Neiger | G06F 9/455 |
| | | | 718/1 |
| 2013/0132735 A1 | 5/2013 | Kottilingal et al. | |
| 2013/0305342 A1 | 11/2013 | Kottilingal et al. | |
| 2013/0326177 A1* | 12/2013 | Oiwa | G06F 3/0647 |
| | | | 711/162 |
| 2014/0201421 A1* | 7/2014 | Schoenberg | G06F 12/1027 |
| | | | 711/6 |
| 2014/0283056 A1 | 9/2014 | Bachwani et al. | |
| 2015/0370628 A1* | 12/2015 | Zmudzinski | G06F 11/1016 |
| | | | 711/133 |
| 2015/0379263 A1* | 12/2015 | Vipat | G06F 21/79 |
| | | | 726/23 |
| 2016/0048464 A1* | 2/2016 | Nakajima | G06F 12/1475 |
| | | | 711/152 |
| 2016/0110554 A1* | 4/2016 | Kang | G06F 21/606 |
| | | | 726/27 |

OTHER PUBLICATIONS

Non-Final Office Action from U.S. Appl. No 14/312,112 mailed Sep. 8, 2016, 14 pages.

* cited by examiner

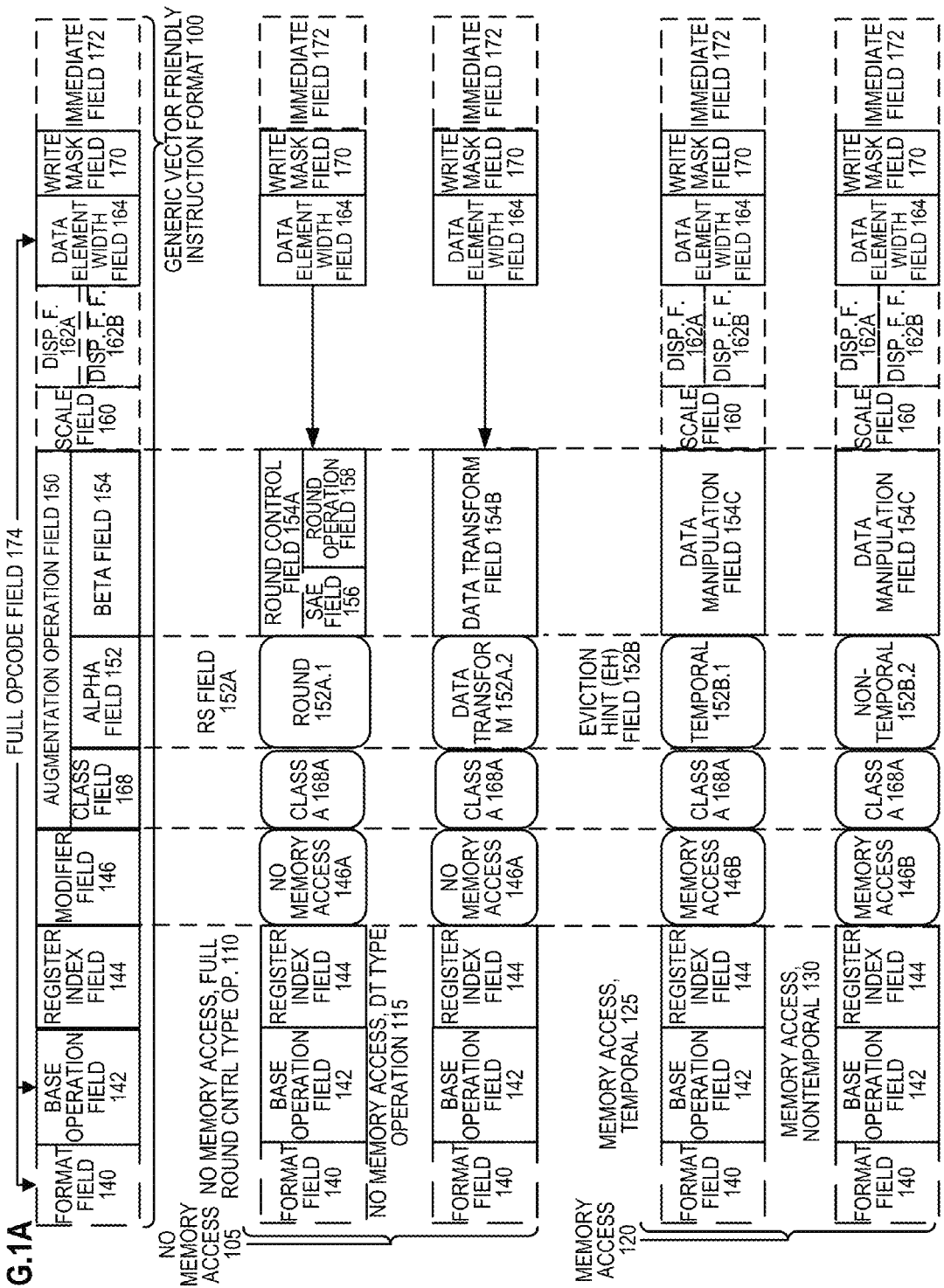

FIG. 2A

SIB BYTE

| 7 6 | 5 4 3 | 2 1 0 |
|---|---|---|
| SS 252 | XXX 254 | BBB 256 |

DISPLACEMENT FIELD QAB62A (DISP32 WHEN MOD=10)

DISPLACEMENT FACTOR FIELD QAB62B (DISP8*N, REFERRED TO AS DISP8*N, BUT HOLDS ONLY THE DISPLACEMENT FACTOR WHICH IS MULTIPLIED BY N

IMM8 QAB72

MOD R/M BYTE

| 7 6 | 5 4 3 | 2 1 0 |
|---|---|---|
| MOD 242 | REG 244 | R/M 246 |

| 0x62 | R X B R' | M M M M M | W | V V V V | U | P P | α | β β β | V' | K K K | Y Y Y Y Y | M M | R/M | SIB | |
|---|---|---|---|---|---|---|---|---|---|---|---|---|---|---|---|

REX 205 · REX' 210 · DATA ELEMENT WIDTH FIELD QAB64 · OPCODE MAP 215 · VVVV FIELD 220 · CLASS FIELD QAB68 · BETA FIELD QAB54 · REX' 210 · ALPHA FIELD QAB52 · WRITE MASK FIELD QAB70 · REAL OPCODE FIELD 230 · MOD R/M 240 · 250

EVEX PREFIX 202 · PREFIX ENCODING FIELD 225

FORMAT FIELD QAB40

SPECIFIC VECTOR FRIENDLY INSTRUCTION FORMAT 200

FIG. 2B

| 0x62 | | P P | M M M | W | Y Y Y Y Y Y |
|---|---|---|---|---|---|

FORMAT FIELD QAB40 · PREFIX ENCODING FIELD 225 · OPCODE MAP 215 · DATA ELEMENT WIDTH FIELD QAB64 · REAL OPCODE FIELD 230

FULL OPCODE FIELD QAB74

BASE OPERATION FIELD QAB42

FIG. 2C

| R X B R' | V' | REG 244 | R/M 246 | V V V V 220 | X X X 254 | B B B 256 |
|---|---|---|---|---|---|---|

REX 205 · REX' 210 · REGISTER INDEX FIELD QAB44 · VVVV FIELD 220

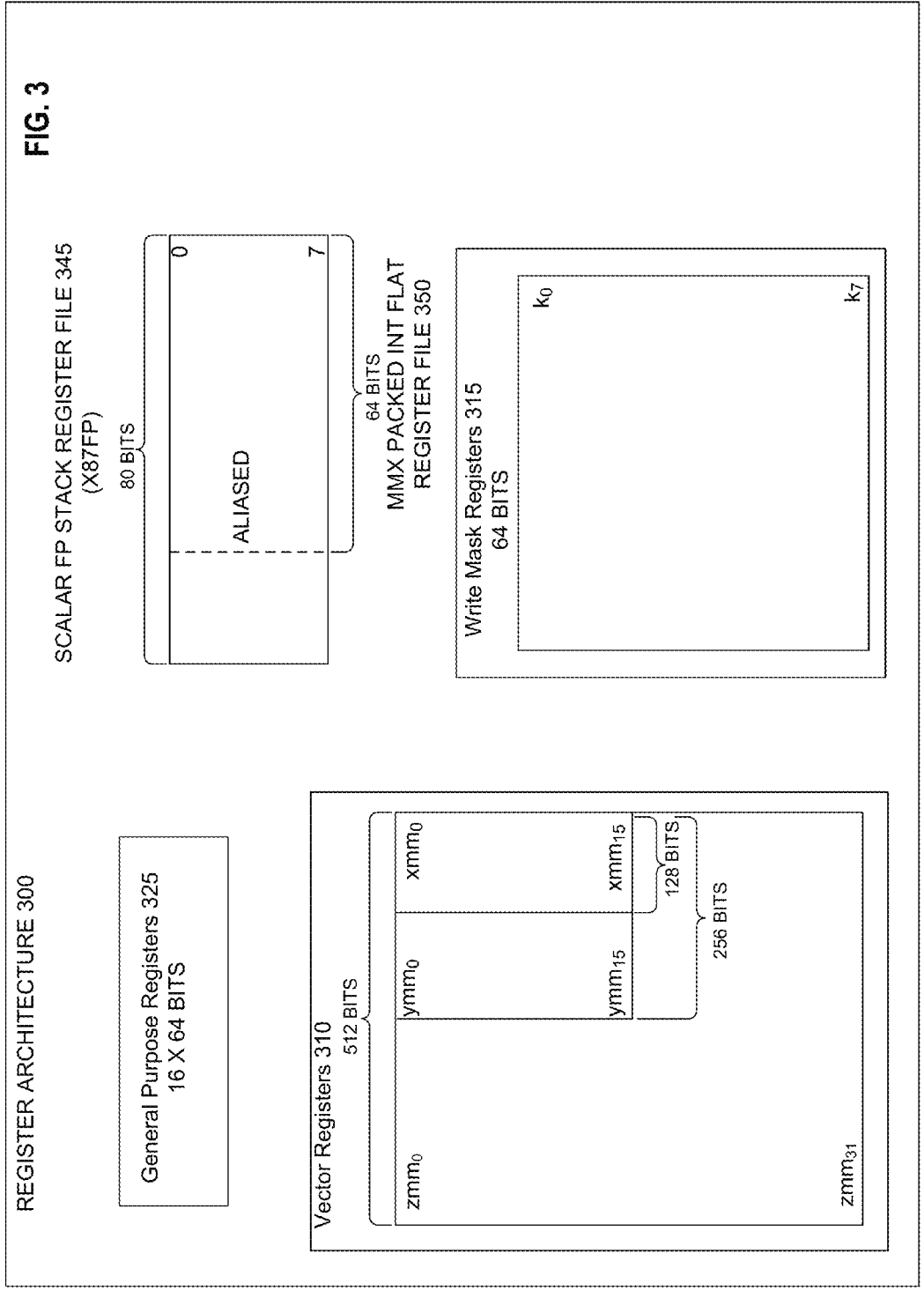

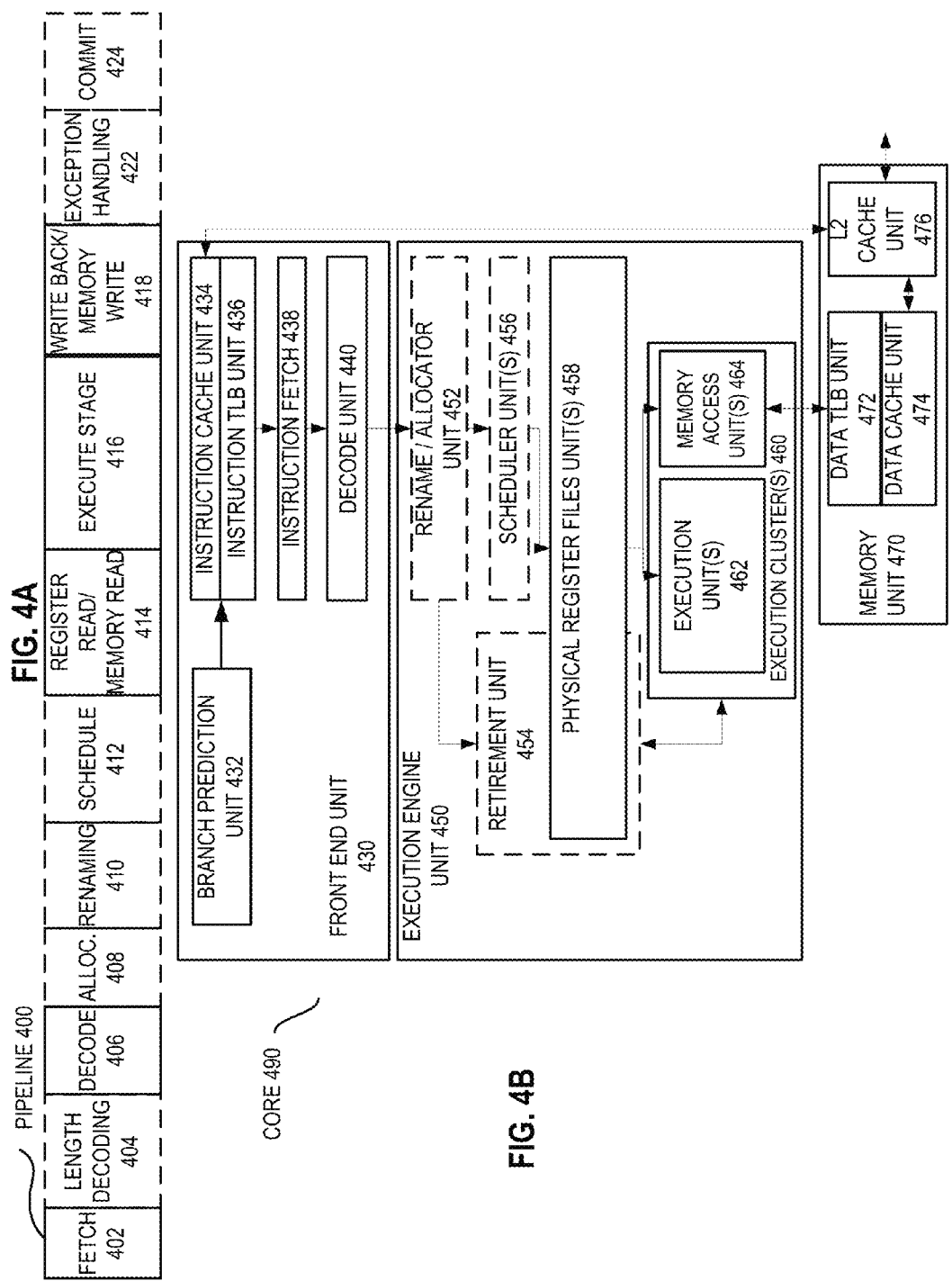

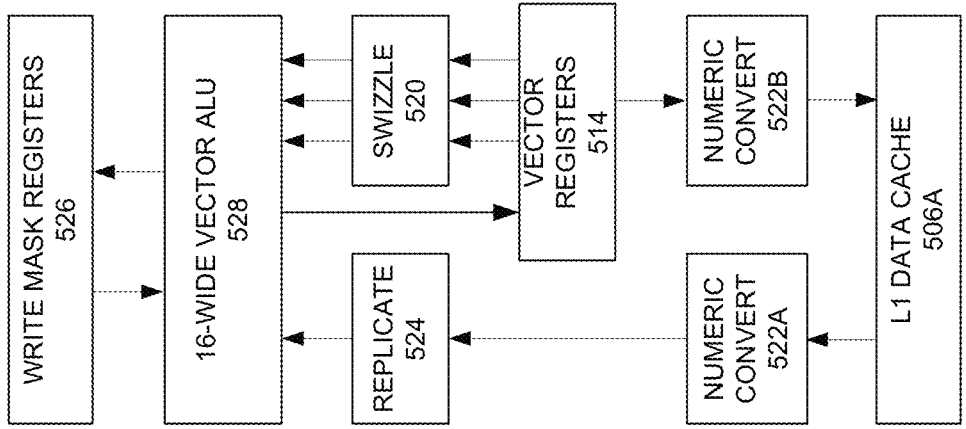
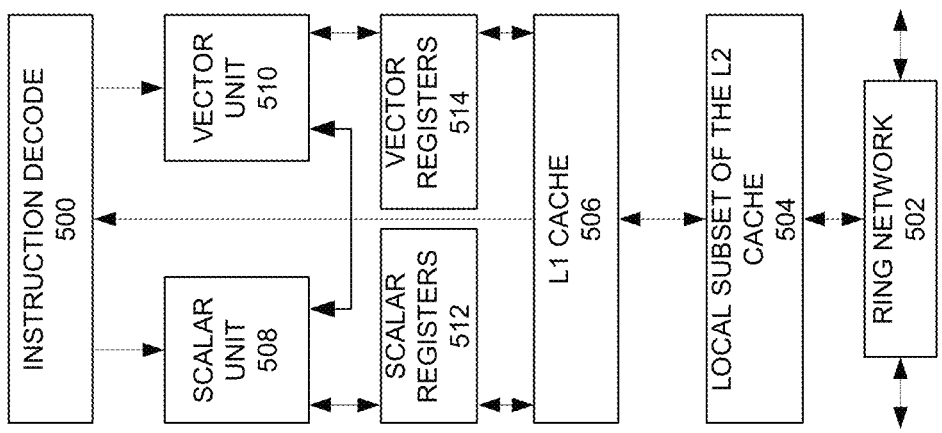

EPT Edit Table
2015

| Leaf EPT Start 2201 | Leaf EPT Size 2202 | GPA Space Start 2203 | GPA Space Size 2204 | HPA Space Start 2205 | HPA Space Size 2206 | Access Permissions (e.g., RWX) 2207 | Reserved 2208 |
|---|---|---|---|---|---|---|---|
| PT.0.0.0.0 | 1024 | 0x20000000 | 0x80000 | 0x4000000 | 1024 | 111 | 0 |
| | | | | | | | |
| | | | | | | | |

FIG. 22

METHOD AND APPARATUS TO ALLOW SECURE GUEST ACCESS TO EXTENDED PAGE TABLES

BACKGROUND

Field of the Invention

This invention relates generally to the field of computer processors. More particularly, the invention relates to a method and apparatus for allowing secure guest access to extended page tables (EPTs).

Description of the Related Art

The development of electronic technology has led to the proliferation and integration of various types of electronic devices. The functionality typically provided by stationary computing devices is now available in mobile and even handheld devices. This evolution has led to users becoming reliant upon their electronics for personal and/or business-related transactions. For example, users may interact with other users and transmit data that may contain information of a sensitive and/or confidential nature (e.g., such as personal identification information, home or work contact information, account numbers, etc.). Some of the information needed to perform the above activities may be stored on the user's device, and thus, may present an attractive target to those would attempt to steal such information.

Various software solutions have been devised to prevent unauthorized access to devices. These software solutions are typically implemented at the same privilege level as the operating system of the device, and thus, may be vulnerable to attacks from malicious software (malware) on the device operating at a higher privilege level. As software developers attempt to strengthen their defenses against being compromised, attackers continue to devise means of compromising these defenses by introducing malicious code at lower levels within the operational hierarchy of the device. For example, malware such as rootkits may attack a device at a higher privilege level than existing malware detection and/or protection measures can accommodate. To combat this threat, equipment manufacturers are beginning to develop hardware-based protection schemes implemented at the lowest operational level/highest privilege level of a device. These protection measures may be designed to provide a secure operating environment in the device by deploying when device operations initiate. However, the integration of such low-level protection measures with existing/emerging operating systems may prove problematic without special provisions.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIG. 2A-D is a block diagram illustrating an exemplary specific vector friendly instruction format according to embodiments of the invention;

FIG. 3 is a block diagram of a register architecture according to one embodiment of the invention; and FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

FIG. 5A is a block diagram of a single processor core, along with its connection to an on-die interconnect network;

FIG. 5B illustrates an expanded view of part of the processor core in FIG. 5A according to embodiments of the invention;

FIG. 22 illustrates an exemplary entry within an EPT edit table in accordance with one embodiment of the invention.

DETAILED DESCRIPTION

Figure 1B:
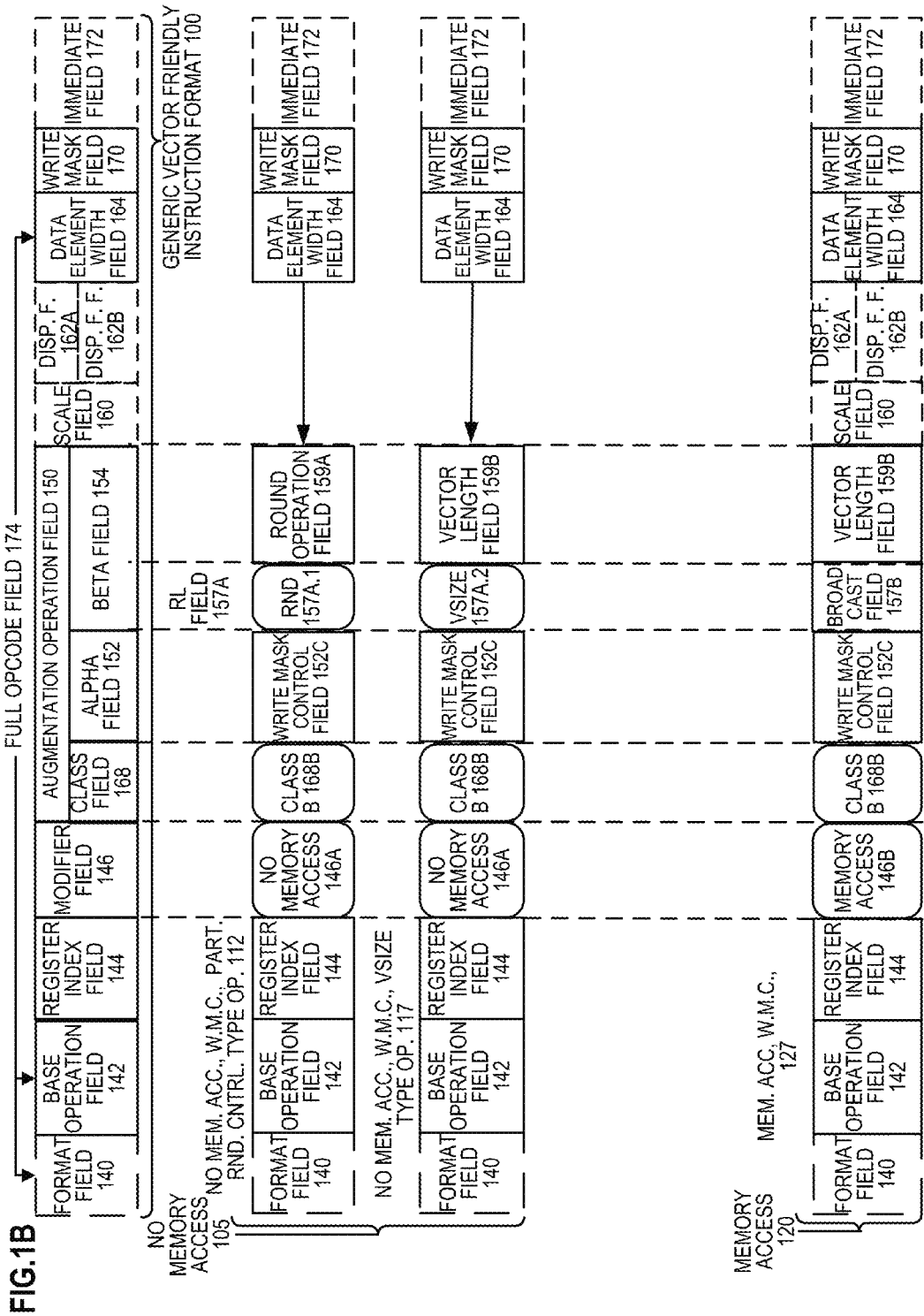

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A. Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}$*index+base).

Displacement Field 162A—its content is used as part of memory address generation (e.g., for address generation that uses $2^{scale}$*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

B. Exemplary Specific Vector Friendly Instruction Format

FIG. 2 is a block diagram illustrating an exemplary specific vector friendly instruction format according to embodiments of the invention. FIG. 2 shows a specific vector friendly instruction format 200 that is specific in the sense that it specifies the location, size, interpretation, and order of the fields, as well as values for some of those fields. The specific vector friendly instruction format 200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 1 into which the fields from FIG. 2 map are illustrated.

It should be understood that, although embodiments of the invention are described with reference to the specific vector friendly instruction format 200 in the context of the generic vector friendly instruction format 100 for illustrative purposes, the invention is not limited to the specific vector friendly instruction format 200 except where claimed. For example, the generic vector friendly instruction format 100 contemplates a variety of possible sizes for the various fields, while the specific vector friendly instruction format 200 is shown as having fields of specific sizes. By way of specific example, while the data element width field 164 is illustrated as a one bit field in the specific vector friendly instruction format 200, the invention is not so limited (that is, the generic vector friendly instruction format 100 contemplates other sizes of the data element width field 164).

The generic vector friendly instruction format 100 includes the following fields listed below in the order illustrated in FIG. 2A.

EVEX Prefix (Bytes 0-3) 202—is encoded in a four-byte form.

Format Field 140 (EVEX Byte 0, bits [7:0])—the first byte (EVEX Byte 0) is the format field 140 and it contains 0x62 (the unique value used for distinguishing the vector friendly instruction format in one embodiment of the invention).

The second-fourth bytes (EVEX Bytes 1-3) include a number of bit fields providing specific capability.

REX field 205 (EVEX Byte 1, bits [7-5])—consists of a EVEX.R bit field (EVEX Byte 1, bit [7]—R), EVEX.X bit field (EVEX byte 1, bit [6]—X), and 157BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 110—this is the first part of the REX' field 110 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 215 (EVEX byte 1, bits [3:0]—mmmm)—its content encodes an implied leading opcode byte (0F, 0F 38, or 0F 3).

Data element width field 164 (EVEX byte 2, bit [7]—W)—is represented by the notation EVEX.W. EVEX.W is used to define the granularity (size) of the datatype (either 32-bit data elements or 64-bit data elements).

EVEX.vvvv 220 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111 b. Thus, EVEX.vvvv field 220 encodes the 4 low-order bits of the first source register specifier stored in inverted (1 s complement) form. Depending on the instruction, an extra different EVEX bit field is used to extend the specifier size to 32 registers.

EVEX.U 168 Class field (EVEX byte 2, bit [2]—U)—If EVEX.U=0, it indicates class A or EVEX.U0; if EVEX.U=1, it indicates class B or EVEX.U1.

Prefix encoding field 225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 154 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 170 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 230 (Byte 4) is also known as the opcode byte. Part of the opcode is specified in this field.

MOD R/M Field 240 (Byte 5) includes MOD field 242, Reg field 244, and R/M field 246. As previously described, the MOD field's 242 content distinguishes between memory access and non-memory access operations. The role of Reg field 244 can be summarized to two situations: encoding either the destination register operand or a source register operand, or be treated as an opcode extension and not used to encode any instruction operand. The role of R/M field 246 may include the following: encoding the instruction operand that references a memory address, or encoding either the destination register operand or a source register operand.

Scale, Index, Base (SIB) Byte (Byte 6)—As previously described, the scale field's 150 content is used for memory address generation. SIB.xxx 254 and SIB.bbb 256—the contents of these fields have been previously referred to with regard to the register indexes Xxxx and Bbbb.

Displacement field 162A (Bytes 7-10)—when MOD field 242 contains 10, bytes 7-10 are the displacement field 162A, and it works the same as the legacy 32-bit displacement (disp32) and works at byte granularity.

Displacement factor field 162B (Byte 7)—when MOD field 242 contains 01, byte 7 is the displacement factor field 162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 162B is a reinterpretation of disp8; when using displacement factor field 162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 162B substitutes the legacy x86 instruction set 8-bit displacement. Thus, the displacement factor field 162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 172 operates as previously described.

Full Opcode Field

FIG. 2B is a block diagram illustrating the fields of the specific vector friendly instruction format 200 that make up the full opcode field 174 according to one embodiment of the invention. Specifically, the full opcode field 174 includes the format field 140, the base operation field 142, and the data element width (W) field 164. The base operation field 142 includes the prefix encoding field 225, the opcode map field 215, and the real opcode field 230.

Register Index Field

FIG. 2C is a block diagram illustrating the fields of the specific vector friendly instruction format 200 that make up the register index field 144 according to one embodiment of the invention. Specifically, the register index field 144 includes the REX field 205, the REX' field 210, the MODR/M.reg field 244, the MODR/M.r/m field 246, the VVVV field 220, xxx field 254, and the bbb field 256.

Augmentation Operation Field

Figure 2D:
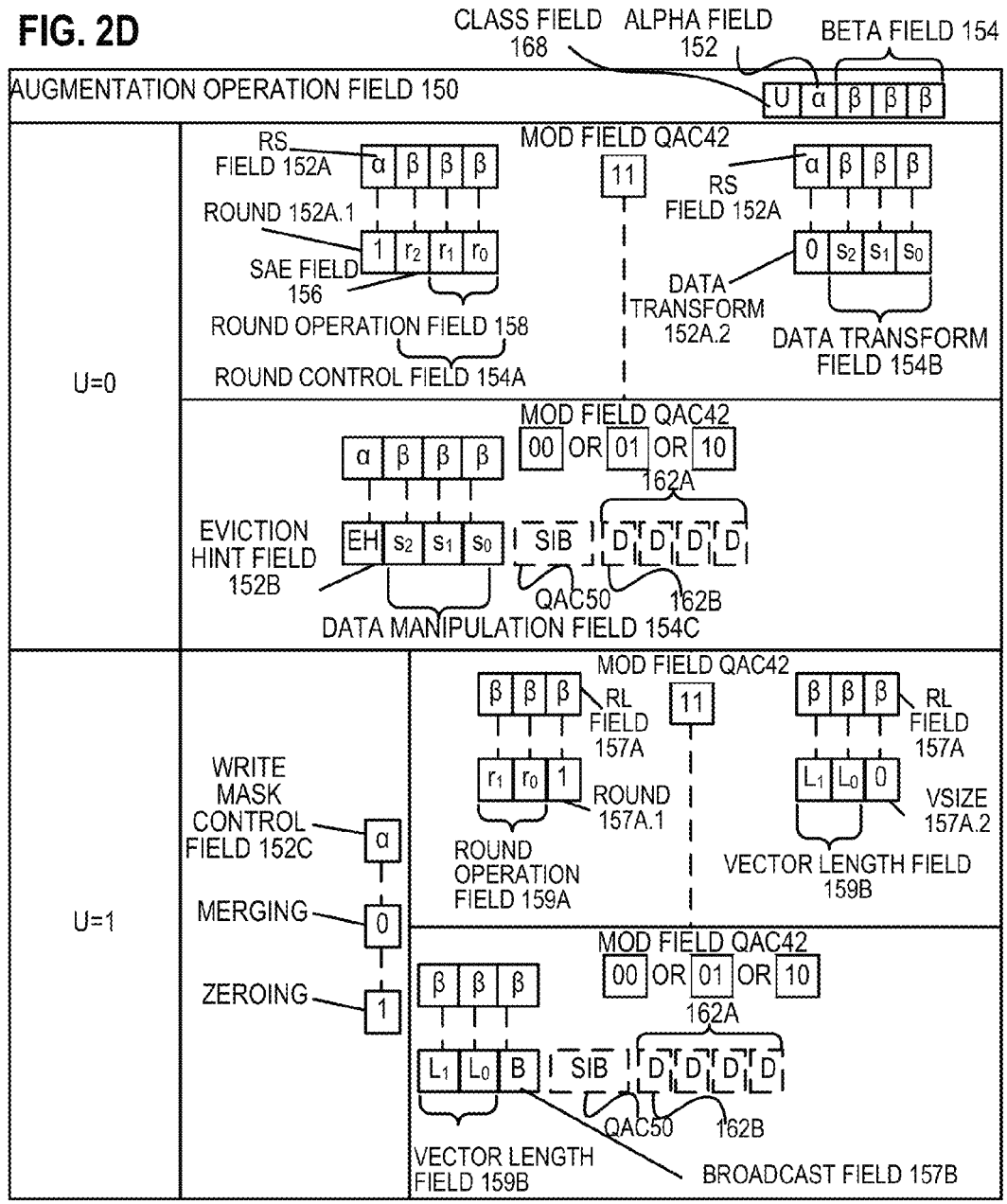

FIG. 2D is a block diagram illustrating the fields of the specific vector friendly instruction format 200 that make up the augmentation operation field 150 according to one embodiment of the invention. When the class (U) field 168 contains 0, it signifies EVEX.U0 (class A 168A); when it contains 1, it signifies EVEX.U1 (class B 168B). When U=0 and the MOD field 242 contains 11 (signifying a no memory access operation), the alpha field 152 (EVEX byte 3, bit [7]—EH) is interpreted as the rs field 152A. When the rs field 152A contains a 1 (round 152A.1), the beta field 154 (EVEX byte 3, bits [6:4]—SSS) is interpreted as the round control field 154A. The round control field 154A includes a one bit SAE field 156 and a two bit round operation field 158. When the rs field 152A contains a 0 (data transform 152A.2), the beta field 154 (EVEX byte 3, bits [6:4]—SSS) is interpreted as a three bit data transform field 154B. When U=0 and the MOD field 242 contains 00, 01, or 10 (signifying a memory access operation), the alpha field 152 (EVEX byte 3, bit [7]—EH) is interpreted as the eviction hint (EH) field 152B and the beta field 154 (EVEX byte 3, bits [6:4]—SSS) is interpreted as a three bit data manipulation field 154C.

When U=1, the alpha field 152 (EVEX byte 3, bit [7]—EH) is interpreted as the write mask control (Z) field 152C. When U=1 and the MOD field 242 contains 11 (signifying a no memory access operation), part of the beta field 154 (EVEX byte 3, bit [4]—$S_0$) is interpreted as the RL field 157A; when it contains a 1 (round 157A.1) the rest of the beta field 154 (EVEX byte 3, bit [6-5]—$S_{2-1}$) is interpreted as the round operation field 159A, while when the RL field 157A contains a 0 (VSIZE 157.A2) the rest of the beta field 154 (EVEX byte 3, bit [6-5]—$S_{2-1}$) is interpreted as the vector length field 159B (EVEX byte 3, bit [6-5]—$L_{1-0}$). When U=1 and the MOD field 242 contains 00, 01, or 10 (signifying a memory access operation), the beta field 154 (EVEX byte 3, bits [6:4]—SSS) is interpreted as the vector length field 159B (EVEX byte 3, bit [6-5]—$L_{1-0}$) and the broadcast field 157B (EVEX byte 3, bit [4]—B).

C. Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 200 operates on these overlaid register file as illustrated in the below tables.

| Adjustable Vector Length | Class | Operations | Registers |
|---|---|---|---|
| Instruction Templates that do not include the vector length field 159B | A (FIG. 1A; U = 0) | 110, 115, 125, 130 | zmm registers (the vector length is 64 byte) |
|  | B (FIG. 1B; U = 1) | 112 | zmm registers (the vector length is 64 byte) |
| Instruction templates that do include the vector length field 159B | B (FIG. 1B; U = 1) | 117, 127 | zmm, ymm, or xmm registers (the vector length is 64 byte, 32 byte, or 16 byte) depending on the vector length field 159B |

In other words, the vector length field 159B selects between a maximum length and one or more other shorter lengths, where each such shorter length is half the length of the preceding length; and instructions templates without the vector length field 159B operate on the maximum vector length. Further, in one embodiment, the class B instruction templates of the specific vector friendly instruction format 200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 315—in the embodiment illustrated, there are 8 write mask registers (k0 through k7), each 64 bits in size. In an alternate embodiment, the write mask registers 315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

D. Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
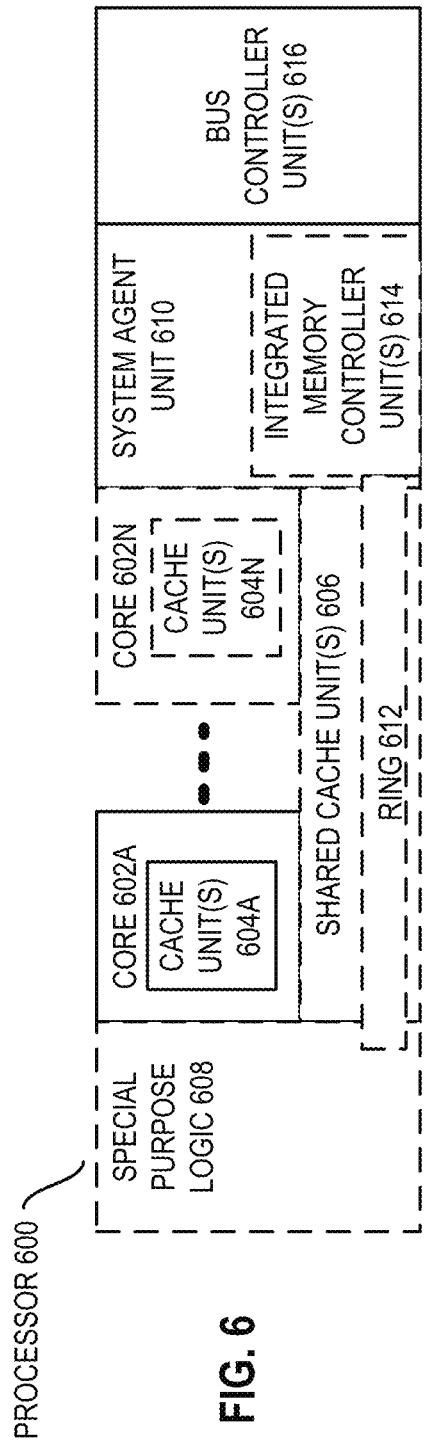
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
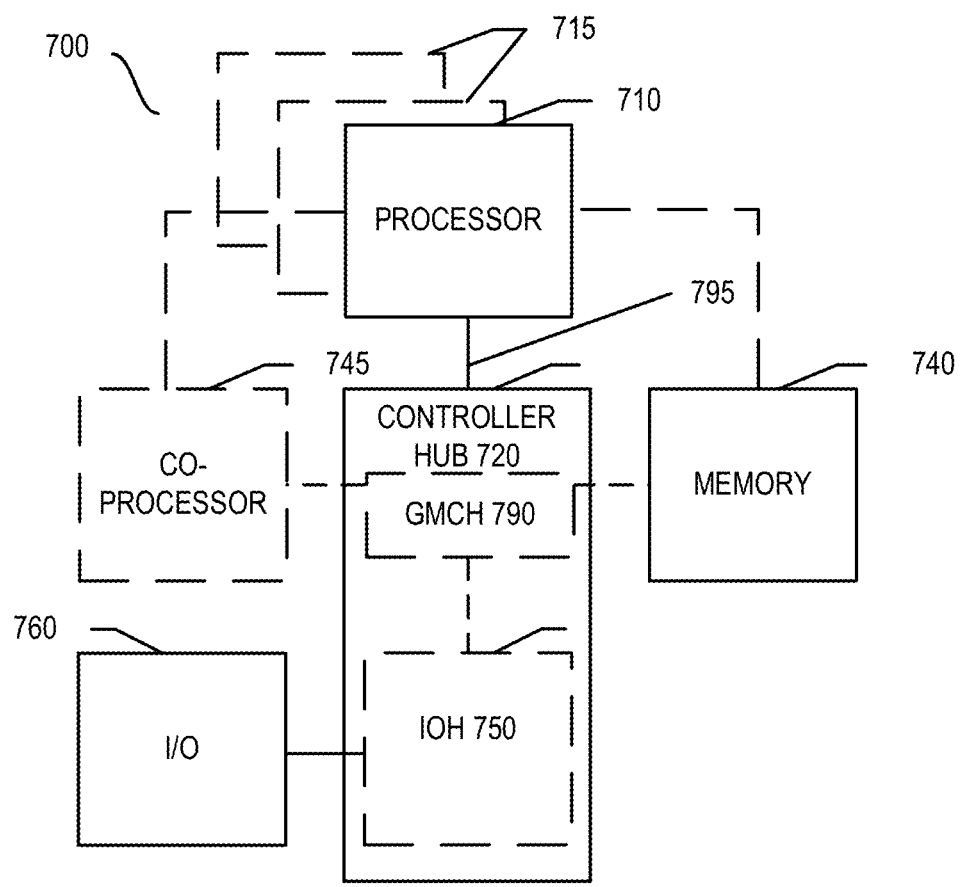
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
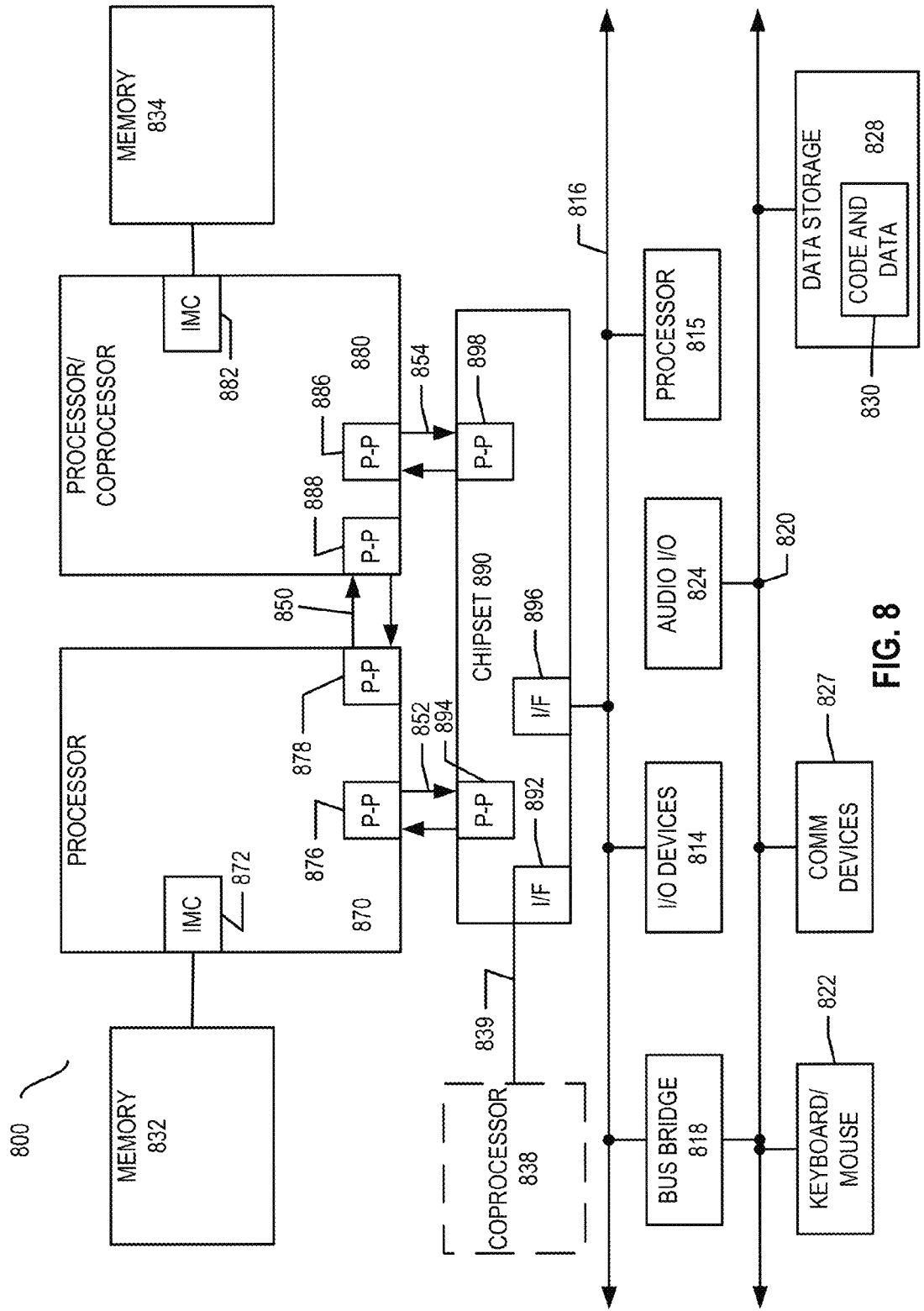
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
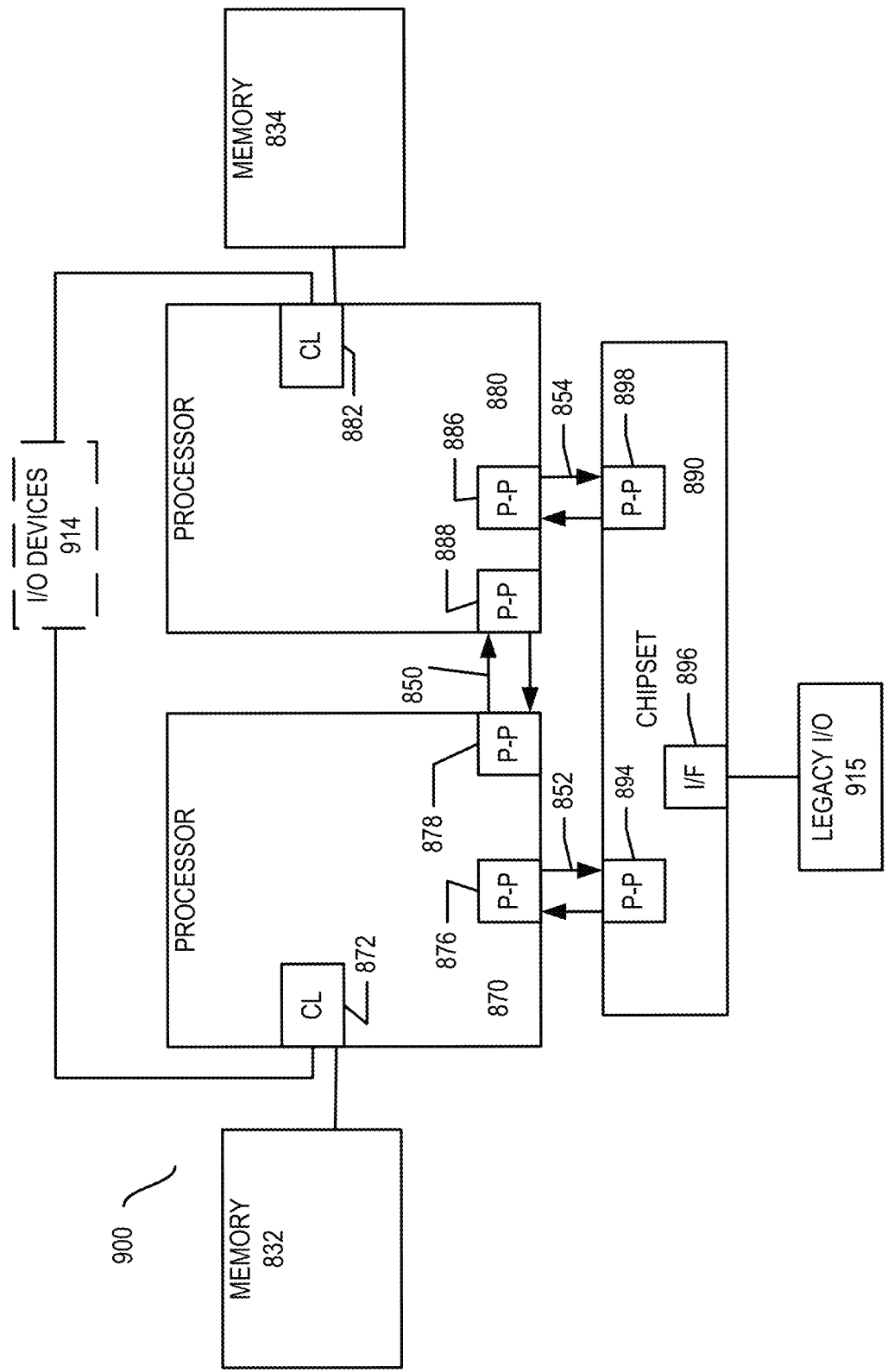
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
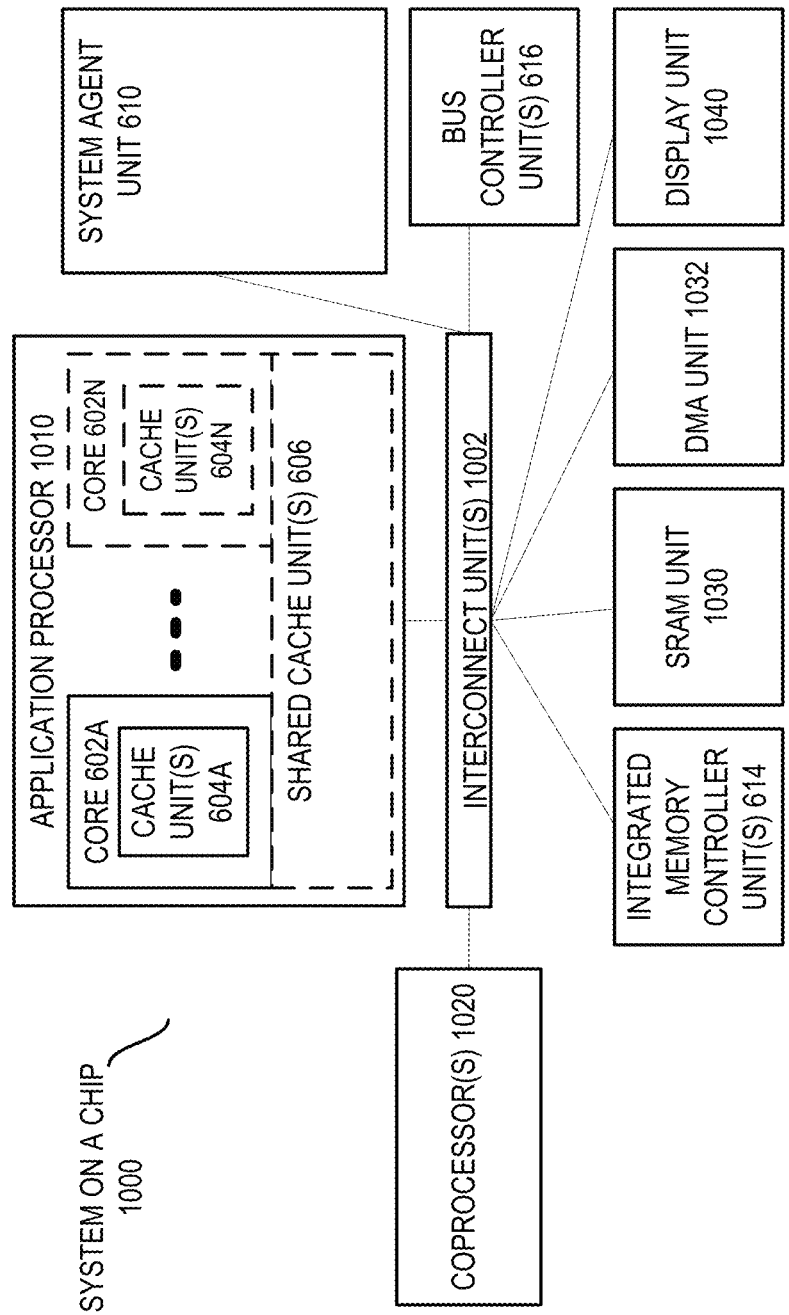
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
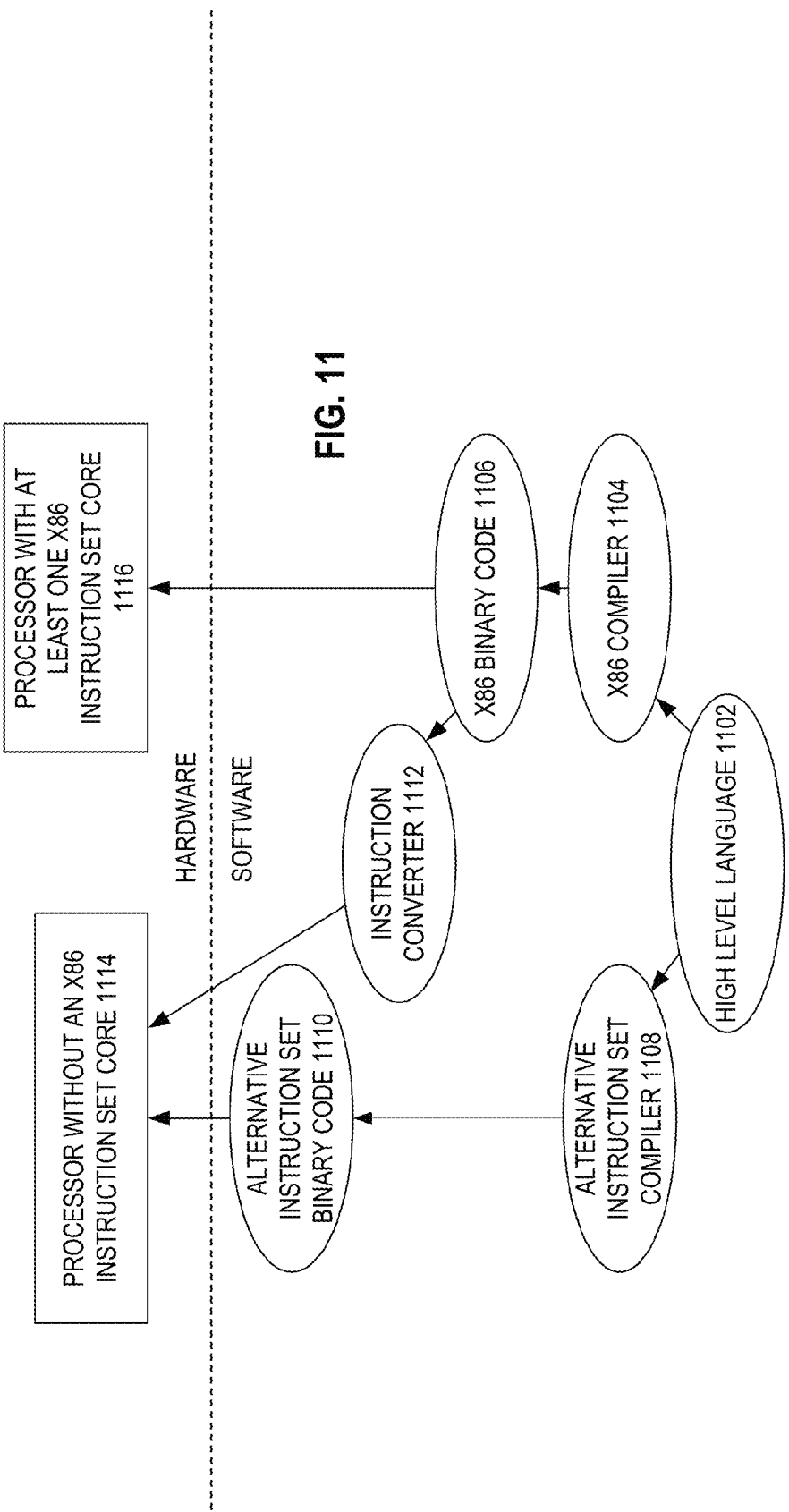
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Method and Apparatus for Employing Intermediary Structures to Access Secure Memory Some embodiments of the invention described below are directed to employing intermediary structures for facilitating access to secure memory. In one embodiment, hardware in a device (e.g., firmware) may load a secure driver (SD) into the device (e.g., upon activation). The SD may reserve at least a section of memory in a memory module of the device as a secure page cache (SPC). The SPC may be able to protect data corresponding to an application executing in the device from being accessed by other active applications (e.g., executing in the operating system (OS) of the device). For example, when an application is executing, linear addresses (LAs) in an application page table (PT) may typically point to the location of secure data pages in the SPC that may be required during execution of the program. However, consistent with the present disclosure, the linear addresses may actually be mapped to pseudo page addresses in a linear address manager (LAM), which may in turn be mapped to page slots in the SPC. The LAM may be interposed between the PT of the application and the SPC to simulate the SPC. In this manner race conditions may be avoided that could negatively impact device performance. Moreover, the SD may facilitate error handling in the device by reconfiguring virtual exceptions (#VEs) that would otherwise be ignored by the OS. For example, the occurrence of a #VE may cause the SD to write an address to a control register to which the OS will react, while information about the actual cause of the #VE is stored elsewhere within a secure address space for later retrieval (e.g., when addressing the cause of the #VE).

In one embodiment, a device configured to employ intermediary structures for facilitating access to secure memory may comprise, for example, at least a memory module and a firmware module. The firmware module may be to cause at least one secure driver to be loaded into the memory module. The secure driver may cause at least one section of memory in the memory module to be reserved as a secure page cache including at least one secure page slot and generate a linear address manager mapping at least one pseudo page address in the linear address manager to the at least one secure page slot.

In one embodiment, the memory module may further include, for example, an operating system in which applications execute, the execution of at least one application in the operating system causing data to be loaded into the secure page cache from elsewhere in the memory module. The application may comprise, for example, at least one page table including at least one linear address reserved by the secure driver for mapping to the at least one pseudo page address in the linear address manager. Consistent with the above example application, the secure driver may further release a linear address reserved by the secure driver for reassignment, map the linear address to a pseudo page address in the linear address manager and load an application page from the application into a secure page slot mapped to the pseudo page address, the application page becoming a secure page upon loading. As the application executes, the secure driver may further determine that a secure page loaded in a secure page slot is to be evicted from the secure page cache based at least on the receipt of a page fault, cause a pseudo page address corresponding to the secure page to be unmapped from the secure page slot in which the secure page is loaded and cause the secure page to be unloaded from the secure page slot. In addition, the secure driver may further cause a new application page to be loaded into the secure page slot, cause a new pseudo page address to be mapped to the secure page slot and cause a new linear address to be mapped to the new pseudo page address.

In the same or a different embodiment, the secure driver may further receive a virtual exception due to a page fault occurring in the secure page cache, reconfigure the virtual exception to be handled by the operating system and provide the reconfigured virtual exception to an operating system kernel. The secure driver reconfiguring the virtual exception may comprise the secure driver pushing an error code on to an operating system call stack and writing a linear address indicating that the virtual exception has occurred to a control register of the processing module to cause an operating system error handler to react to the virtual exception, the linear address indicating the virtual exception being within an address space of an application that caused the exception and outside of a secure address space within the memory module. Moreover, the secure driver may further write a linear address that caused the virtual exception to a register in the secure address space in the memory module. An example method consistent with the present disclosure may comprise causing at least one section of memory to be reserved as a secure page cache including at least one secure page slot and generating a linear address manager mapping at least one pseudo page address in the linear address manager to the at least one secure page slot.

Figure 12:
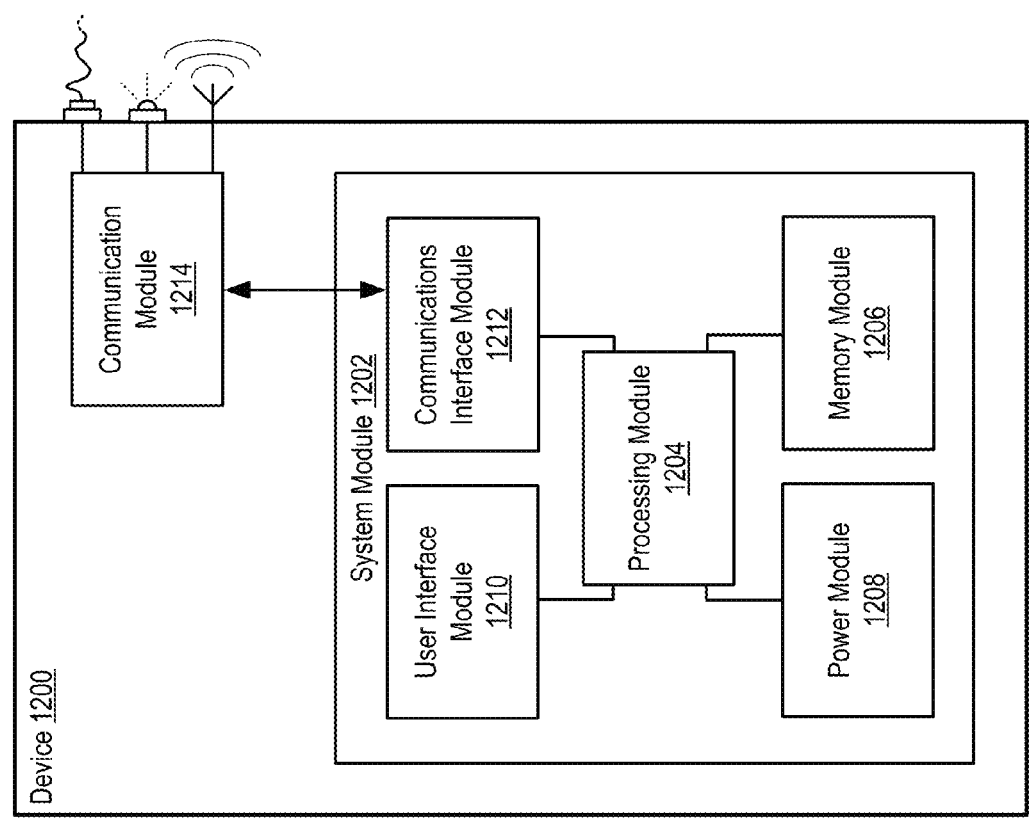
FIG. 12 illustrates an example configuration for a device usable in accordance with at least one embodiment of the present disclosure.

FIG. 12 illustrates an example configuration for device 1200 usable in accordance with at least one embodiment of the present disclosure. The various systems, components, methods, etc. disclosed herein may be applicable to a wide range of electronic devices. Device 1200 may be, for example, a mobile communication device such as a cellular handset or a smartphone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Regardless, device 1200 has been provided only as a general example of an apparatus on which embodiments consistent with the present disclosure may be configured, and is not meant to limit these various embodiments to any particular manner of implementation.

Device 1200 may comprise, for example, system module 1202 configured to manage device operations. System module 102 may include, for example, processing module 1204, memory module 1206, power module 1208, user interface module 1210 and communication interface module 1212. Device 1200 may also include communication module 1214. While communication module 1214 has been shown as separate from system module 1300, the example implementation disclosed in FIG. 12 has been provided merely for the sake of explanation. Some or all of the functionality associated with communication module 1214 may be incorporated into system module 1202.

In device 1200, processing module 1204 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing module 104 may interact with other system components that may be operating at different speeds, on different buses, etc. in device 1200. Some or all of the functionality commonly associated with the support circuitry may also be included in the same physical package as the processor (e.g., such as in the Sandy Bridge family of processors available from the Intel Corporation).

Processing module 1204 may be configured to execute various instructions in device 1200. Instructions may include program code configured to cause processing module 1204 to perform activities related to reading data, writing data, processing data, formulating data, converting data, transforming data, etc. Information (e.g., instructions, data, etc.) may be stored in memory module 1206. Memory module 1206 may comprise random access memory (RAM) or read-only memory (ROM) in a fixed or removable format. RAM may include volatile memory configured to hold information during the operation of device 1200 such as, for example, static RAM (SRAM) or Dynamic RAM (DRAM). ROM may include non-volatile (NV) memory modules configured based on BIOS, UEFI, etc. to provide instructions when device 1200 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 1208 may include internal power sources (e.g., a battery, fuel cell, etc.) and/or external power sources (e.g., electromechanical or solar generator, power grid, fuel cell, etc.), and related circuitry configured to supply device 1200 with the power needed to operate. User interface module 1210 may include hardware and/or software to allow users to interact with device 1200 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 1210 may be incorporated within device 1200 and/or may be coupled to device 1200 via a wired or wireless communication medium.

Communication interface module 1212 may be configured to manage packet routing and other control functions for communication module 1214, which may include resources configured to support wired and/or wireless communications. In some instances, device 1200 may comprise more than one communication module 1214 (e.g., including separate physical interface modules for wired protocols and/or wireless radios) all managed by a centralized communication interface module 1212. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 1212 may be configured to prevent wireless communications that are active in communication module 1214 from interfering with each other. In performing this function, communication interface module 1212 may schedule activities for communication module 1214 based on, for example, the relative priority of messages awaiting transmission. While the embodiment disclosed in FIG. 12 illustrates communication interface module 1212 being separate from communication module 1214, it may also be possible for the functionality of communication interface module 1212 and communication module 1214 to be incorporated within the same module.

Figure 13:
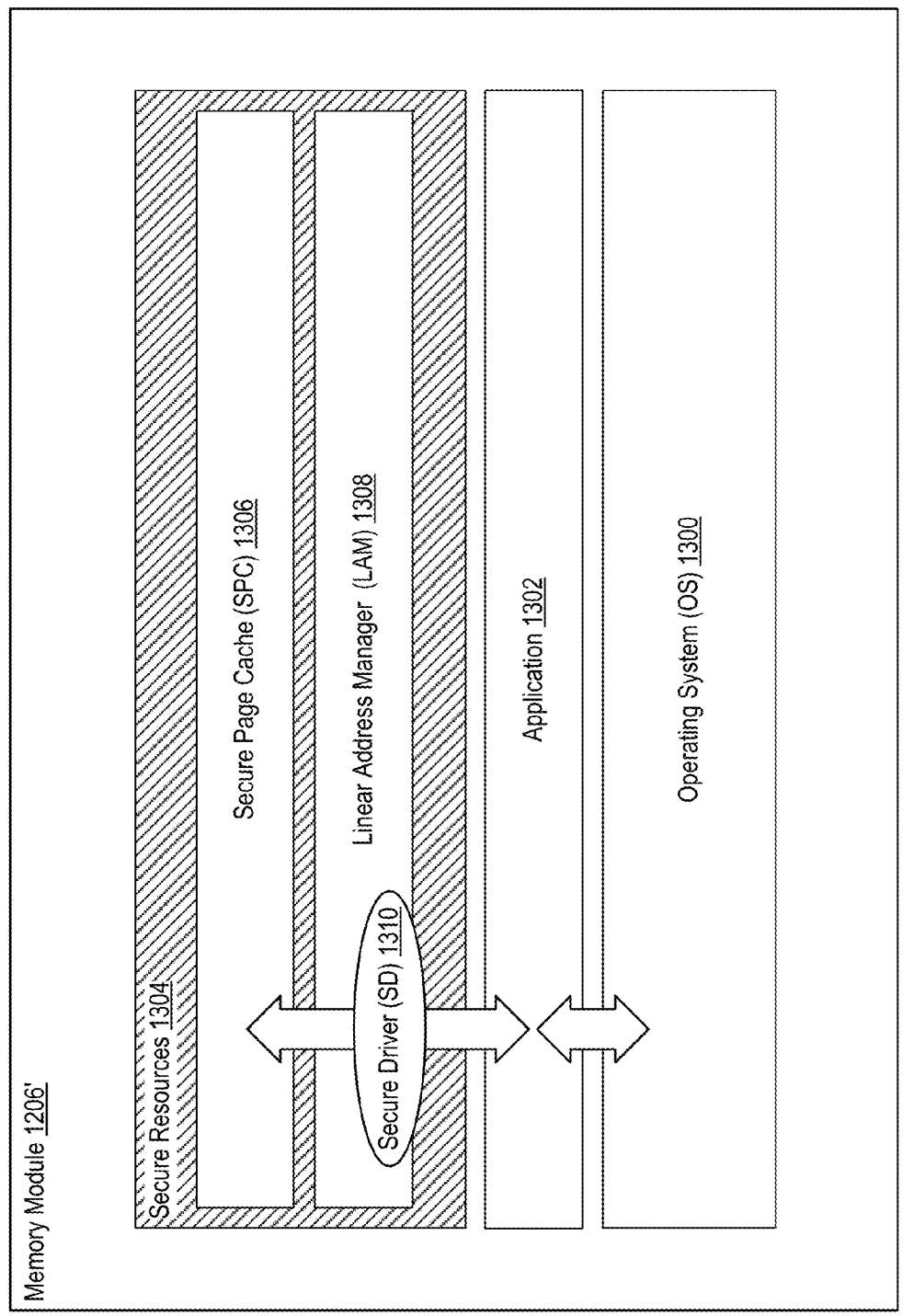
FIG. 13 illustrates an example memory module employing intermediary structures for facilitating access to secure memory in accordance with at least one embodiment of the present disclosure.

FIG. 13 illustrates example memory module 1206 employing intermediary structures for facilitating access to secure memory in accordance with at least one embodiment of the present disclosure. Initially, various embodiments disclosed herein will be described using terminology that may be commonly associated with certain equipment manufacturers (e.g., Intel Corporation) and/or software providers (e.g., Microsoft Corporation). The use of this terminology is merely to convey important concepts in a readily comprehensible context, and is not intended to limit any implementation consistent with the present disclosure to particular equipment and/or software.

In general, various embodiments consistent with the present disclosure may allow for the implementation of a hardware-based memory protection scheme in a device that may include an OS that is not directly compatible with the protection scheme. More specifically, the protection scheme may require certain interfaces and/or interaction with the OS that may not be supported by all types and/or versions of OS. Embodiments consistent with the present disclosure may be able to account for the lack of direct support from an OS when implementing memory protection.

An example implementation of memory module 1206 may comprise, for example, at least OS 1300, application 1302 and secure resources 1304. Secure resources 1304 may comprise at least SPC 1306 and LAM 1308. From a communication standpoint, SD 1310 may facilitate interaction between Application 1302, LAM 1308 and SPC 1306 in secure resources 1304. To react to a #VE, SD 1310 may reconfigure the #VE so that it may be recognized by OS 1300, which hands off the #VE to application 1302, which routes the #VE to SD 1310 for handling the cause of the exception.

OS 1300 may comprise, for example, at least one software program configured to manage the operation of equipment comprising computing functionality. Examples of OS 1300 have been set forth above. In many instances, features associated with the Windows OS will be referenced merely for the sake of explanation herein. Secure resources 1304 may include a hardware-based protection scheme such as Software Guard Extensions (SGX) designed by the Intel Corporation. SGX includes a set of new instructions and memory access changes embedded in the architecture of certain Intel® processors and chipsets. These extensions allow application 1302 to instantiate a protected container, or "enclave," which may be an area within the address space of application 1302 providing confidentiality, integrity, etc., even in the presence of highly privileged malware. Attempted access to an enclave from software not resident in the enclave is prevented, even from privileged software such as virtual machine monitors, BIOS, components of OS 1300, etc.

The SGX architecture comprises new instructions, new processor structures and a new mode of execution. These include, for example, loading an enclave into protected memory, access to resources via PT mapping and scheduling the execution of enclave-enabled application 1302. Thus, OS 1300 still maintains control as to what resources an enclave can access. SGX operations may be categorized into the following functions: enclave build/teardown, enclave entry/exit, enclave security operations, paging instructions, and debug instructions. Instructions that may be used to allocate protected memory for the enclave, load values into the protected memory, measure (e.g., verifying a hash value of a program's code against the hash value of a known good version of the program) software loaded into the enclave's protected memory and teardown the enclave after application 1302 has completed are as follows: "ECREATE" may declare base and range, and may initiate a build, "EADD" may add a 4 K page to the enclave, "EEXTEND" may measure 1356 bytes, "EINIT" may declare an enclave built and "EREMOVE" may remove a page from the enclave. These instructions may be executed by SD 1310 (e.g., ring-0 software typically referred to as the SGX driver).

SD 1310 may be loaded into device 1200 by, for example, firmware within memory module 1206. In one embodiment, the firmware may load SD 1310 when device 1200 is activated (e.g., from a cold boot, rebooted, etc.). In one embodiment, SD 210 may be measured by a previously loaded/measured program, the measurement of a subsequently loaded program by a measured program also being known as establishing a "Chain of Trust" in device 1300.

Other instructions may be used to enter and exit the enclave. An enclave can be entered using "EENTER," and exited using "EEXIT," explicitly. It may also be exited asynchronously using "AEX" due to interrupts or exceptions. In the instance of AEX the hardware may save all secrets inside the enclave, scrub secrets from registers, and return to external program flow. Application 1302 may then resume where it left off execution. Instructions that may allow OS 1300 to securely move enclave pages to and from unprotected memory may include, for example, "EPA" to create a version array page, "ELDB/U" to load an evicted page into protected memory, "EWB" to evict a protected page, as well as "EBLOCK" and "ETRACK" to prepare for eviction.

In general, secure resources 1304 may include instructions that the SD 1310 can execute to implement paging of secure pages loaded into SPC 1406. While the protection provided by secure resources 1304 may enable application 1302 to execute with confidentiality, integrity etc., paging secure pages loaded into SPC 11306 may have certain requirements. Using SGX as an example, it is required that OS 1300 offer a particular memory management application program interface (API) and is capable of a special handling of SPC memory access faults. Most modern operating systems feature some kind of Structured Exception Handling (SEH) mechanism. SEH enables applications to handle hardware and software exceptions. Memory access exceptions typically result in page faults (#PF) that are handled by OS 1300 first. However, if OS 1300 can't deal with a particular #PF it may hand it to application 202 that caused the #PF in the first place through the SEH mechanism. The second requirement for SPC paging may be a memory management API that allows for reservation of LA of secure pages that are not currently loaded in SPC 1306. Such an API would allow for the un-mapping of secure LAs (SLAs) from the physical address of the pages (SPs) of SPC 1306 while, at the same time, reserving those addresses until evicted enclave pages are again loaded into SPC 1306. Unfortunately, the above error handling and API features are unavailable in most, if not all, of the commonly available operating systems.

Figure 14:
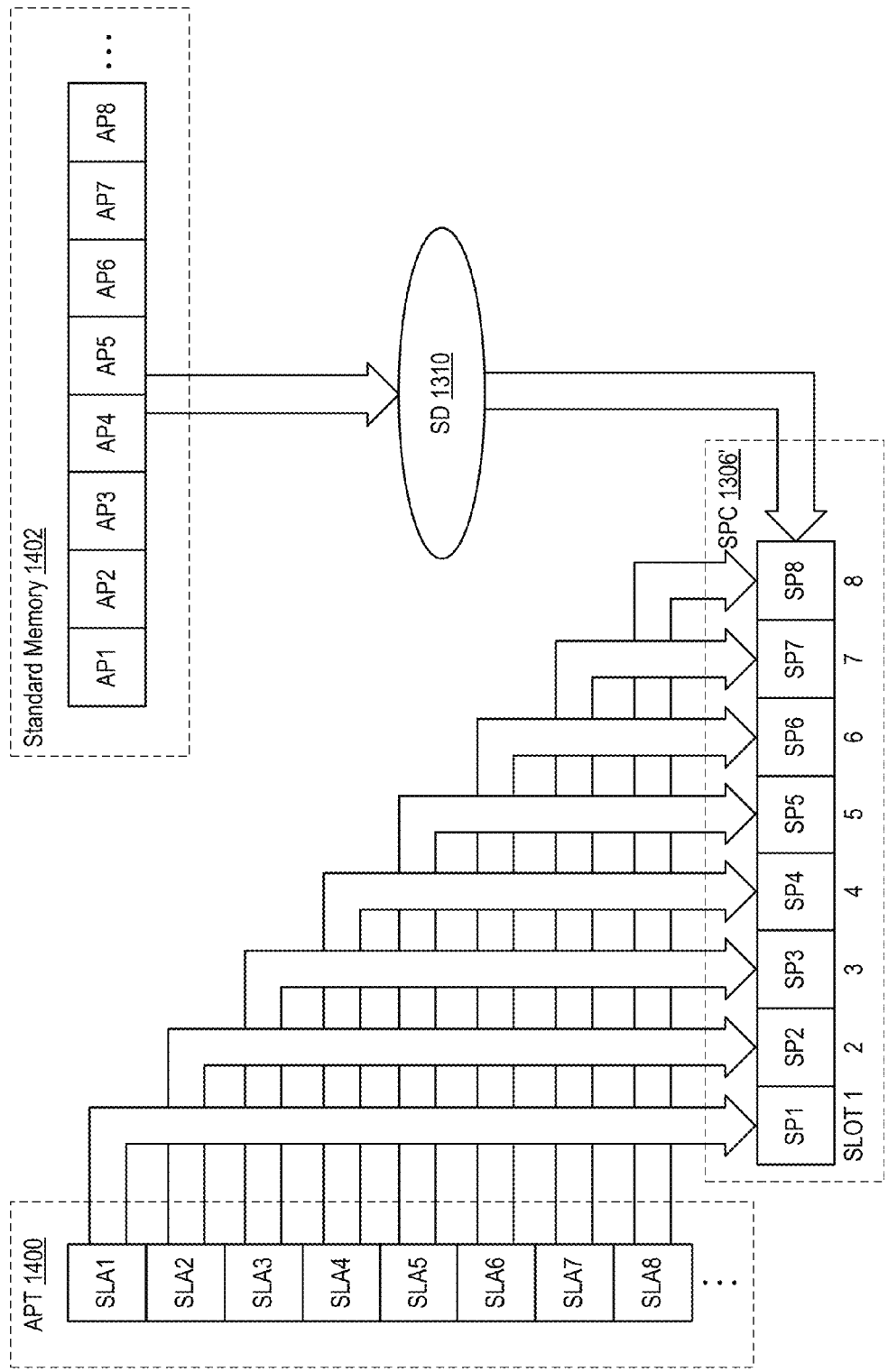
FIG. 14 illustrates an example of memory mapping between an application and a secure memory in accordance with at least one embodiment of the present disclosure.

FIG. 14 illustrates an example of memory mapping between an application and a secure memory in accordance with at least one embodiment of the present disclosure. Assuming that SD 1310 is loaded and operational, application 1302 may cause SPC 206 to be loaded by executing a series of Input and Output Control (IOCTL) calls to the SD 310. Using SGX as an example, in addition to ECREATE and EADD IOCTLs, application 1302 may also execute EEXTEND and EINIT IOCTLs while SPC 1306' is being loaded. EEXTEND IOCTLs may be executed multiple times for each loaded secure page to measure SPC 1306' during loading and EINIT IOCTL may be executed once at the end to pass the final measurement to the hardware for verification. The various measurement and verification operations that may occur during the loading of SPC 1306' have been omitted from the figures for clarity. While they may occur in due course, their operation is not relevant to the embodiments disclosed herein. The first IOCTL (e.g., ECREATE_IOCTL) signals that SPC 1306 is about to be loaded. Based on arguments that application 1302 may pass as part of the ECREATE_IOCTL call, SD 1310 may reserve a region of application virtual memory to be later mapped to the physical addresses (e.g., also called SPC slots) where the SPC 1306 will be loaded.

FIG. 14 illustrates eight application pages AP1, AP2, AP3, AP4, AP5, AP6, AP7 and AP8 (e.g., collectively "SP 1-8") belonging to application 1302 residing in standard memory 1402 (e.g., other memory space in memory module 1206). The IOCTL calls may then be made, loading AP 1-8 into an empty SPC 1306' with eight available slots including slot 1, slot 2, slot 3, slot 4, slot 5, slot 6, slot 7 and slot 8 (collectively "SLOTS 1-8"). Following loading into SLOTS 1-8, AP 1-8 may become secure pages SP1, SP2, SP3, SP4, SP5, SP6, SP7 and SP8 (collectively "SP 1-8"). At least one page table belonging to the process of application 1202 (e.g., APT 300) may comprise eight page frames SLA1, SLA2, SLA3, SLA4, SLA5, SLAG, SLA7 and SLA8 (e.g., collectively SLA 1-8) after OS 300 grants the request to reserve a virtual address space region for SPC 1306' being loaded. At this point, some internal data structures have been allocated and the SD 1310 may be ready to load the AP 1-8 into available SPC slots as soon as application 1302 issues the EADD_IOCTL instruction. After application 1302 executes the first EADD_IOCTL request, SD 1310 may execute a two-part memory remap request. The first part may free an LA (e.g., SLA 1) so it may be mapped to a corresponding physical address space (e.g., SLOT 1) in the next part. Following mapping of an SLA to a physical address space, the corresponding application page (e.g., AP1) may then be loaded into the physical address space (e.g., SLOT 1), the application page then becoming a secure page (e.g., SP1). This process may be repeated until SLA 1-8 are mapped to SLOTS 1-8, into which SP 1-8 are loaded, respectively. The above two-part memory remap request may be subject to a race condition. In a scenario when application 1302 requests a memory allocation on another thread, OS 1300 could grant the allocation request and use the newly freed LA before the second part is completed by SD 1310. Should that occur, the SD 1310 would have to abort and the whole build process would have to start anew.

Figure 15:
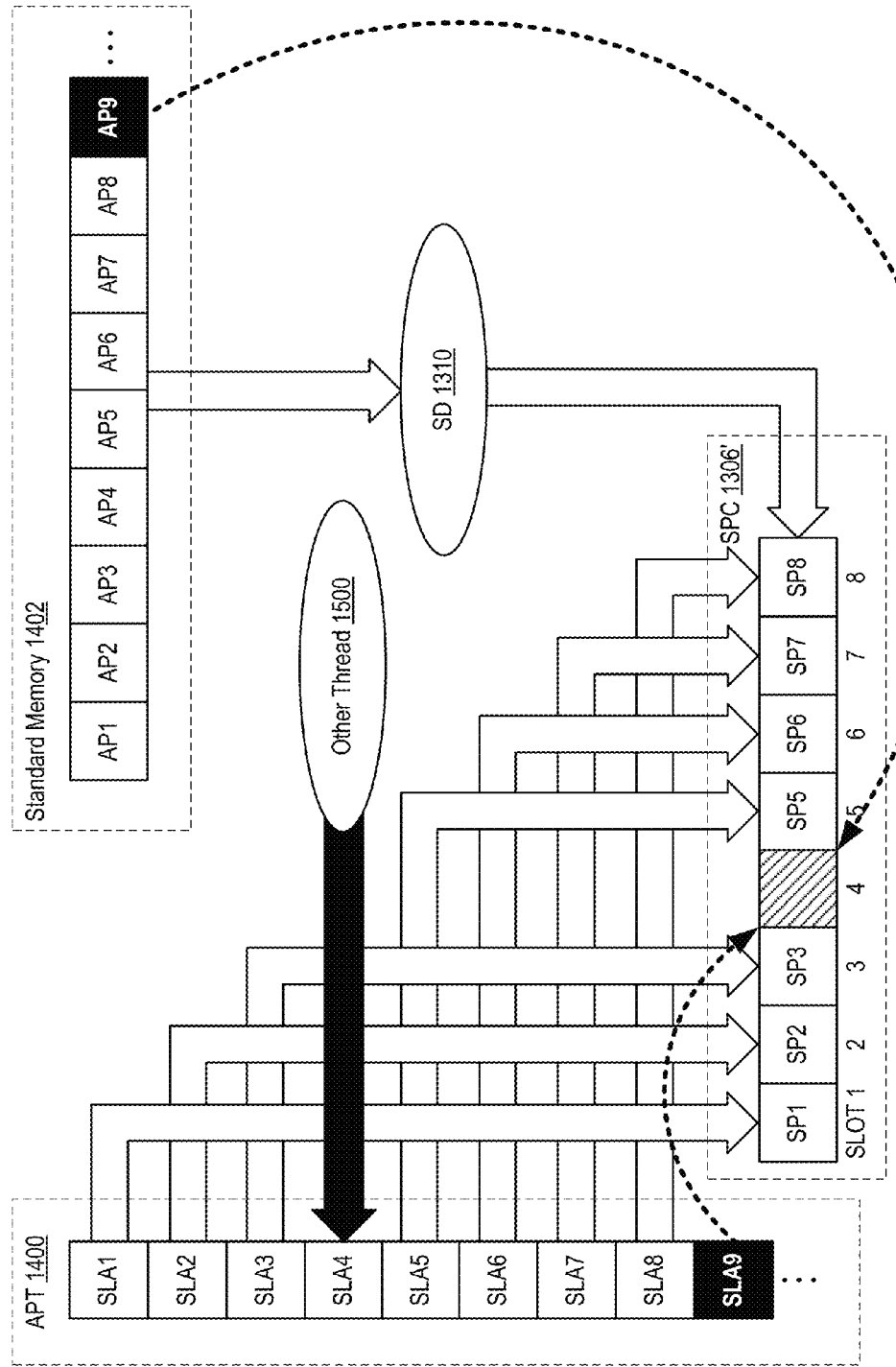
FIG. 15 illustrates an example of a timing issue when evicting a secure page from a slot in a secure page cache in accordance with at least one embodiment of the present disclosure.

FIG. 15 illustrates an example of a timing issue when evicting a secure page from a slot in a secure page cache in accordance with at least one embodiment of the present disclosure. While the race condition disclosed above may be unlikely, a much more complicated case can arise in a situation when an SP 1-8 has to be evicted from the SPC 1306'. SD 1310 must be able to handle situations when the size of individual enclaves, or the total size of all loaded enclaves, exceeds the size of SPC 1306. For example, when SGX is employed SD 1310 may employ SGX paging instructions to evict at least one SP 1-8 (e.g., also known as "victim pages") from SPC 1310 so that new application pages (e.g., also known as "target pages") may be loaded into SPC 1310.

Given that, for example, that SGX is being utilized and OS 1300 is Windows, SD 1310 must utilize the Windows memory address space management API to load application pages and to implement an enclave page cache (EPC) paging scheme. For example, prior to SGX being enabled in device 1200 (e.g., in the early stages of the system boot), special range registers called processor reserved memory range registers (PRMRRs) may be disabled. EPC may be a part of PRM, and for the purpose of the present disclosure it may be assumed that PRM is in fact EPC. As far as OS 1300 is concerned, the mappings between LAs and physical address in application PTs are exactly the same whether they refer to regular physical memory or EPC memory. The CPU may enforce that LAs mapped to physical addresses within the EPC can only be accessed in the special SGX mode (e.g., just as the SMRAM may only be accessed in SMI mode.) If not accessed in SGX mode, they have the same behavior as so called abort page accesses; writes are silently dropped and reads return "−1."

There are two classes of API that may be important. The first class allocates and frees application virtual address space. For example, the "ZwAllocateVirtualMemory" routine may reserve and/or commit a region of pages within the user-mode virtual address space of a specified process while the "ZwFreeVirtualMemory" routine may release and/or decommit a region of pages within the virtual address space of a specified process. The second class of API including the routines "ZwMapViewOfSection" and "ZwUnmapViewOfSection" may map physical addresses (e.g., called section views) into the LA space and may unmap such section views from LAs. When SD 1310 needs to load another enclave page (e.g., SP9) to an already full EPC (e.g., either through EADD or one of the ELD instructions) it may first identify/evict a victim page (e.g., SP4) using a sequence of EBLOCK, ETRACK and EWB instructions (e.g., hereafter "EWB"). After SD 1310 evicts the victim page via EWB (e.g., leaving slot 4 in SPC 1306' available for new SP 9), the LA of the evicted page (e.g., SLA4) may then be unmapped using the ZwUnmapViewOfSection routine and may reserve that virtual address (e.g., using the ZwAllocateVirtualMemory routine) in the instance the evicted page needs to be reloaded later. This two-part process may be called "parking" the LA. However, the virtual memory remapping process can fail due to a race condition whereby another thread 1500 from application 1302 may request to allocate some virtual memory, which may result in OS 1300 reusing the newly freed LA SLA4 to fulfill the request. At this point SD 310 can't recover the linear address. It returns an error code to application 1302 and destroys the enclave.

Figure 16:
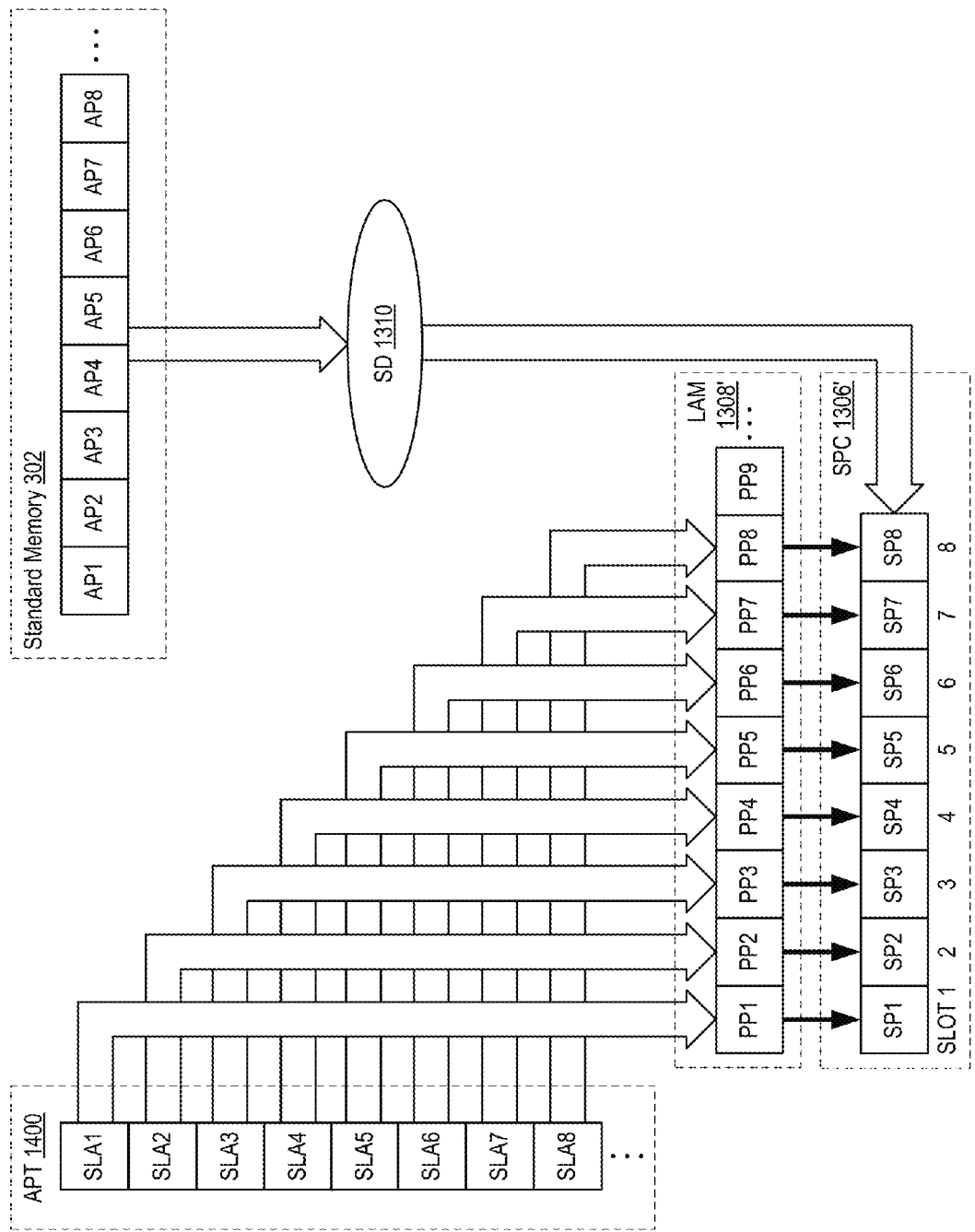
FIG. 16 illustrates an example of an intermediary structure to avoid timing possible issues in accordance with at least one embodiment of the present disclosure.

FIG. 16 illustrates an example of an intermediary structure to avoid timing possible issues in accordance with at least one embodiment of the present disclosure. In at least one example implementation, the Intel architecture may allow OS 1300 to maintain PTs that translate LAs into physical addresses, and #PFs may be delivered through the Interrupt Descriptor Table (IDT) to the appropriate OS handler. When virtualization turns on Extended Page Tables (EPTs), an additional layer of address translation is introduced by software operating in VMX-root mode (e.g., host mode) called a hypervisor. A virtual machine (VM) containing OS 1300 is "hosted" as a guest, so the OS-maintained linear and physical addresses are now called guest linear addresses (GLA) and guest physical addresses (GPA), respectively. EPTs may translate from GPAs to host physical addresses (HPA), and access faults called EPT violations may be delivered to the hypervisor via a VM-exit. The hypervisor can convert EPT violations to guest page faults. The limitations evident in the Windows memory address space management API may be remedied by permanently mapping enclave linear address space creating GLA→GPA mappings that never change. Such mappings would be created before SD 1310 executes the ECREATE instruction and may not be released until the last enclave page was removed from SPC 1306'. In other words the enclave linear address space would be permanently parked. At the same time, to enable access faults for evicted enclave pages, an additional level of address translation can be added using EPTs. EPTs may map GPAs of such parking space (e.g., LAM 1308') to HPAs of the actual EPC. GPA→HPA mappings for secure pages evicted from SPC 1306' would be marked not present in EPTs. Also, mappings for available slots in LAM 1308' would be marked not present. Access to such pages would engender EPT violations that the hypervisor would convert to #PFs. The setup of LAM 1308' may require only a very minimalistic VT hypervisor that doesn't have to be a full-blown VMM. It may assume there is only one guest and that no hardware resources have to be virtualized. The hypervisor has to create EPTs that map LAM 1308' into GPA space. The guest (e.g., OS 1300) may, for example, discover this additional "memory" through a new CPUID 0x12 leaf. It is important to note that this design will limit the total size of enclaves that can be "loaded" into LAM 1308' at any given time. That size may depend on the size of LAM 1308' mapped into GPA space. However, even in SGX (e.g., with the required OS support for EPC paging) that size may still be limited by the amount of physical memory that OS 1300 is willing to page to disk so this point can be neglected for now.

For example, SD 1310 may execute a new leaf of CPUID 0x12 to discover where in the GPA space LAM 1308' is located and how big it is. SD 1310 may then map LAs of enclave pages (e.g., SLA 1-8) to pseudo page addresses PP1, PP2, PP3, PP4, PP5, PP6, PP7, PP8 and PP9 (e.g., collectively PP 1-9) of LAM 1308' using application PTs as SPC 1306' is loaded. For SP 1-8 loaded into SPC 1306', SD 1310 may change the mappings in the EPTs so PP 1-9 are mapped to Slots 1-8. For any SP1-8 that is evicted from SPC 1306' the mappings may indicate that (e.g., be marked as) the evicted SP 1-8 is not present. When any SP 1-8 that is evicted from SPC 1306' is accessed, EPT violations may be generated by processing module 1204. An EPT violation can be delivered only to the hypervisor via a VM exit. Since the hypervisor is not involved in the EPC management, it may convert EPT violations to #PFs by, for example, manipulating the guest's virtual machine control structure (VMCS). #PFs are delivered to the SGX driver through the structured exception handling. The driver finds victim pages and evicts them from EPC and loads the missing pages into EPC. When the victim pages are evicted, the driver marks the corresponding mappings in EPTs as not present and invalidates them. When the missing pages are loaded into EPC, the driver updates the corresponding EPT mappings with the new EPC HPA and marks them as present. The mappings in application PTs for any enclave pages involved in this process do not change.

Figure 17:
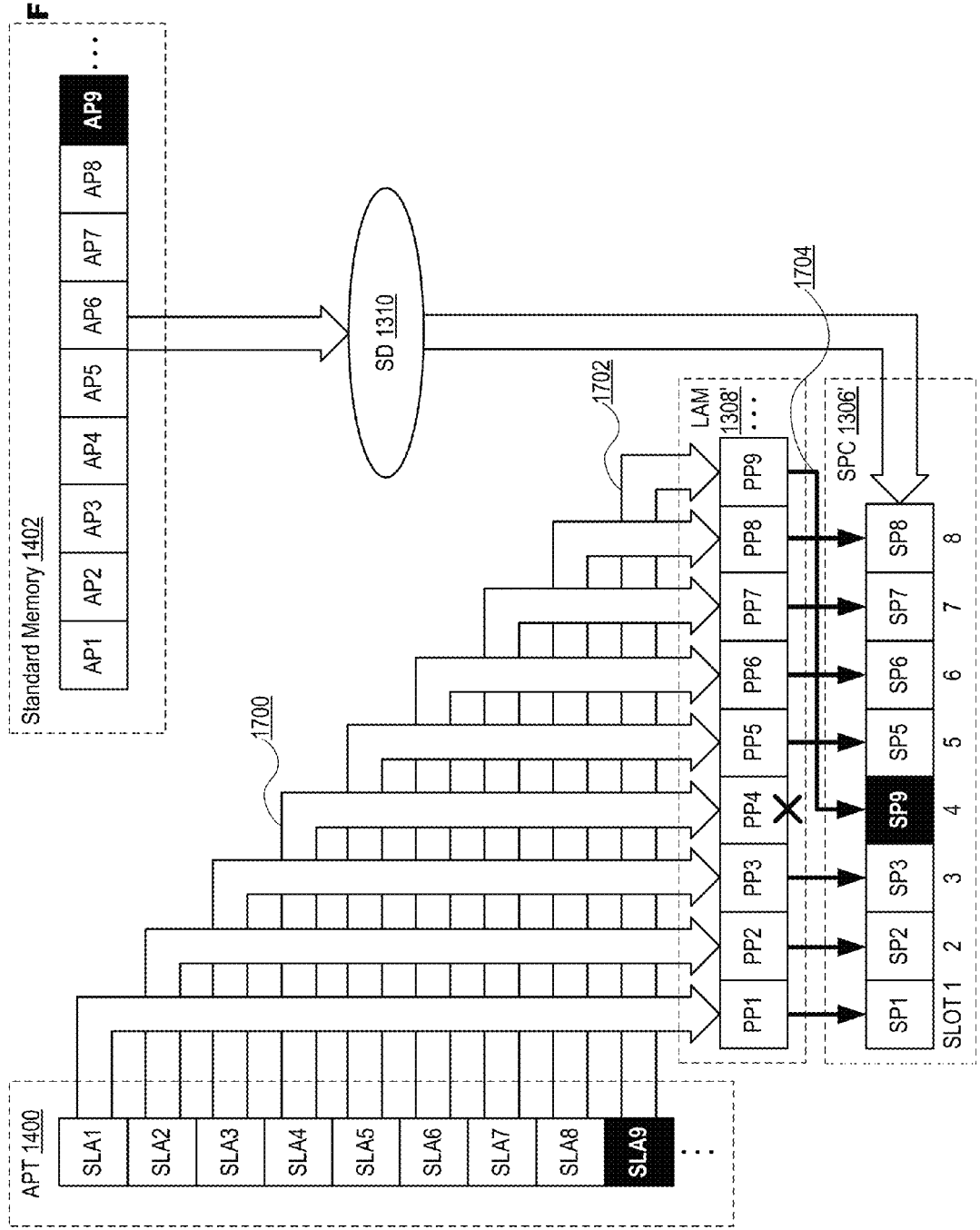
FIG. 17 illustrates an example operation wherein a secure page is evicted from a slot in a secure cache using an intermediary structure in accordance with at least one embodiment of the present disclosure.

FIG. 17 illustrates an example operation wherein a secure page is evicted from a slot in a secure cache using an intermediary structure in accordance with at least one embodiment of the present disclosure. FIG. 17 illustrates how SLAB 1-8 are mapped to EPC through FEPC using APT 1400 and EPTs. It also shows that SLAB 1-8 are never remapped while enclave pages are evicted from EPC and loaded back into EPC. In the example depicted in FIG. 17, SP4 is evicted from SPC 1306' to make room for the SP9. New LA SLA9 may then be mapped to PP9, which may be mapped to slot 4 containing SP9. However, SLA4 remains reserved (e.g., mapped to PP4) so it can't be reused by OS 200 when another thread in application 1302 requests a LA for the newly allocated memory. When access to SP4 through SLA4 is attempted, an access fault may result because the EPT mapping between LAM 1308' and SPC 1306' is not present. SD 1310 may then receive the fault as a #PF and may evict another SP to free up room to reload SP4. If other thread 1500 (e.g., from FIG. 15) would happen to request some memory from the heap, OS 200 may then be forced to use an SLA that resides outside of SPC 206'.

Implementing systems such as disclosed above is not without challenges to overcome. Proof-of-Concept (PoC) testing (e.g., utilizing Intel equipment and a Microsoft Windows OS) has demonstrated that reserving the SLAB prior to issuing an ECREATE instruction may be very wasteful because SPC 1306' may be very sparse. Moreover, reserving the declared LA space by mapping LAM 1308' in EPTs may unnecessarily waste EPT entries for LAM 1308', and any attempt to reclaim those wasted entries after the last EADD may add a performance penalty and unnecessary code complexity to SD 1310. To account for these issues, the PoC was mapped SLAB to GPAs in LAM 308' prior to each EADD. This workaround was deemed acceptable as long as other threads did not attempt to allocate memory that could result in the race condition described above. More importantly, EPT violations converted to #PFs based on the actual faulting GLAs may be ignored by OS 1300 as spurious because the GLA→GPA mappings they refer to may be considered "valid" as far as OS 1300 is concerned. Adding the performance penalty of VM exits required for such conversion, a better solution has to be used. Lastly, as GPAs in LAM 1308' are mapped to HPAs in SPC 1206' when an SP is loaded into a slot in SPC 1306' or invalidated when an SP is evicted, the GPA→HPA these mappings have to be updated. Normally, this is done in a hypervisor because the INVEPT instruction used to invalidate cached EPT mappings can only be executed in the VMX-root mode. Since only SD 1310 knows which mappings to change and how, a VMCALL instruction is needed to communicate this knowledge to the hypervisor. VMCALLs cause VM exits into the hypervisor, which may be an expensive proposition at least from a data processing performance standpoint.

A remedy for the above performance concerns may be found in some Intel processors and chipsets operating in conjunction with a Windows OS. For example, Virtual Technology (VT) architecture (e.g., available in certain products from the Intel corporation) may comprise special extensions that facilitate performance improvements for view management and are enabled with EPTs while in VMX-root operation. At least one special extension may include a feature called EPT pointer (EPTP) switching that allows the guest software to switch between different EPT hierarchies called views. EPTP introduces the ability for EPT violations to be mutated into a new exception type called virtualization exception (#VE, vector 20) which OS 1300 can handle as it has the same semantics as a #PF. This provides OS 1300 with the ability to detect and/or respond to EPT violations with the latency of exception handling as opposed to accruing VM-exit latencies before reaching the view management logic. EPTP switching may be based on EPT structure hierarchies, each describing exclusive memory region. An EPTP List is a page-size data structure with up to 512 EPTPs that point to first-level (PML4) EPT pages, which in turn point to different EPT hierarchies. The EPT hierarchies may define memory views that share some parts of GPA space between them. A PML4.0 view is often called the default view. Guest software can switch between EPT views by executing the VMFUNC instruction with the first argument passed in the EAX register set to 0 and the second argument passed in the ECX register set to the view number. In order to move from one memory view to another without incurring a VM-exit, the VMFUNC-calling page in the active, source memory view must share that page with the destination memory view.

In x64 editions of Windows, Microsoft chose to begin to enforce what system structures drivers can and cannot modify. Kernel Patch Protection (KPP), or "PatchGuard" as it is known informally, is the technology that enforces the restrictions. PatchGuard may periodically verify that protected system structures in the kernel have not been modified. If a modification is detected, Windows may initiate a bug check and shut down the system with a blue screen and/or reboot. The corresponding bug check number is 0x109 and the bug check code is CRITICAL_STRUCTURE_CORRUPTION. Prohibited modifications may include: modifying system service tables, modifying the interrupt descriptor table, modifying the global descriptor table, using kernel stacks not allocated by the kernel, modifying or patching code contained within the kernel itself or the HAL or NDIS kernel libraries, etc.

By employing BP extensions, the design of LAM 1308' can be improved significantly. However additional changes to the hypervisor may be required. The hypervisor may enable EPTP switching and the mutation of EPT violations into #VEs by manipulating various guest controls to allow the SD 1310 to change the EPT mappings for LAM 208' directly and securely. The hypervisor may map last-level EPTs that contain GPA→HPA mappings between LAM 1308' and SPC 1306' into the GPA space. To protect those mappings from attacks, the hypervisor may create a special EPT view that is identical to the default EPT view except that all pages are mapped with read-write access permissions only. This prevents any code in the default view from accessing the EPT pages for LAM 1308' by default. The view contains EPT pages of LAM 1308' mapped into the GPA space with read-write access permissions. The hypervisor may also add a VMCALL that allows SD 1310 to add more pages to that view with read-write-execute access permissions. SD 1310 may use the VMCALL to add code pages that switch between the default view and the view containing EPTs of LAM 1308' and to manipulate these EPT mappings.

For example, an EPT view (e.g., PML4.511) for LAM 1308' may be generated by the hypervisor including two code pages from the #PF handler that SD 1310 may use to switch to the PML4.511 view, quickly access and edit EPT mappings for LAM 1308', and switch back to the default view. SD 1310 may still need to execute a VMCALL if it wants to invalidate cached FEPC EPT mappings for enclave pages evicted from EPC because only software in VMX-root mode can execute the INVEPT instruction. However, a "special trick" may be employed to invalidate EPT mappings by executing the VM function 0.

EPT mappings may be tagged with Address Space Identifiers (ASID) that, together with the actual GPA→HPA mapping, make them unique across all views. The maximum number of EPT views for any processor is 512 (e.g., a memory page is 4096 bytes and one EPTP record is eight bytes, so there are 4096/8 records). There is only one EPTP List page per CPU core. Thus, it is possible to generate up to 511 EPTP views that are exactly the same, plus a 512th view that allows the driver to edit the leaf EPTs that map LAM 1308' to the SPC 206' (e.g., assuming the number of ASIDs will never exceed 512). For example, the hypervisor, using so called ASID-rotation techniques, may generate copies of the default PML4 EPT page and populate the EPTP list with EPTPs pointing to the copies. SD 210 may execute VMFUNC (0, index), where the index may increase from 0 to 511 and then back to 0, whenever stale EPT mappings for LAM 1308' are to be invalidated. In an example of operation, a CPU may use four ASIDs, so the hypervisor may create five default views. SD 1310 may then rotate through views PML4.0 to PML4.4 and back to PML4.0. The PML4.511 view may still be reserved for EPTs in LAM 1308' and the code that manipulates them.

Figure 18:
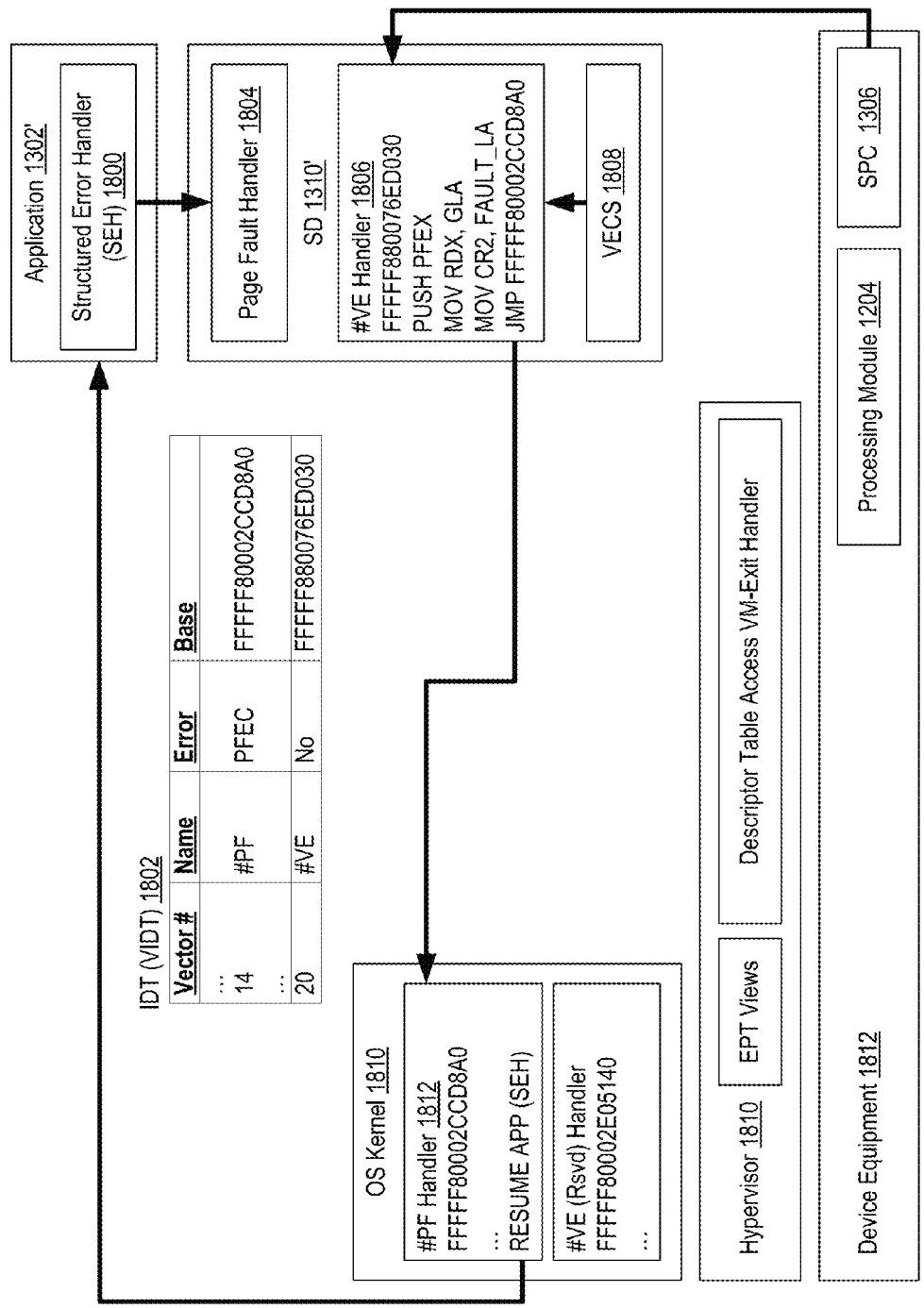
FIG. 18 illustrates an example of virtual exception handling in accordance with at least one embodiment of the present disclosure.

FIG. 18 illustrates an example of virtual exception handling in accordance with at least one embodiment of the present disclosure. In order to handle #VEs generated by access to EPT mappings in LAM 1308' marked as not present, the SGX driver has to hook the #VE vector in IDT of OS 1300 on all hardware threads. This is normally accomplished by replacing the address of the #VE handler in IDT with a new address. However, IDTs are system data structures that the Windows PatchGuard protects. SD 1310' cannot modify the original IDTs, so instead it has to create new ones. SD 1310' may execute the SIDT instruction on all hardware threads to retrieve the values from IDT register (IDTR) including addresses where IDTs are located. SD 310' may then makes copies of the original IDTs replacing the address of the original #VE handler with the address of the driver's own #VE handler. SD 1310' may then execute the LIDT on all hardware cores with the addresses of the new IDTs. The values in IDTRs are also checked periodically by the PatchGuard utility and, if they are changed, PatchGuard will initiate the bug check process. This can be remedied by virtualizing IDTRs in the hypervisor. The hypervisor can enable VM-exits on access to any descriptor table register whenever LGDT, LIDT, LLDT, LTR, SGDT, SIDT, SLDT, and STR are executed. The hypervisor may then return the original value of the table register instead of its current contents. The hypervisor may then enable another VMCALL that SD 1310' may utilize to pass the values of the original descriptor table registers, which the hypervisor supplies whenever SGDT or SIDT are executed. Hooking the IDT in this manner is sometimes called generating a Virtual IDT or VIDT 1802. VIDT 1802 is not generally necessary to any embodiment consistent with the present disclosure, and thus, may be employed on an as-needed basis depending on, for example, OS 1300 (e.g., Windows OS with PatchGuard enabled).

When a #VE is generated by processing module 1204, it writes the information associated with the exception to a special data structure called a Virtualization-Exception Information Area (#VE Info). The information may comprise four 64-bit values: current EPTP, error code, GLA, and GPA. #VEs may be enabled by writing the address of the #VE Info to a field in the guest VMCS. Since only the hypervisor can edit the guest VMCS, SD 1310' may use VMCALL to pass the address of #VE Info for each processor core in processing module 104. SD 1310' and the hypervisor may then use a special structure called VE control structure or VECS 1808 to communicate via the VMCALL instruction. The hypervisor allocates one page for VECS 708 that SD 1310' discovers using a new leaf in CPUID 0x12. VECS 1808 may be divided between all hardware cores and it may store the #VE Info and the descriptor table registers for each core. The hypervisor writes the #VE Info address to the guest VMCS to enable #VEs. In addition to reading the values in the descriptor table register area whenever SGDT or SIDT are executed, the hypervisor may also write to that area in the case OS 1300 changes them by executing LGDT or LIDT. Since VECS 1808 contains information that is needed to handle #VEs, it may reside in memory that is not paged by the kernel. A fault inside a fault handler would lead to a double fault, which is normally handled by the kernel.

Exceptions and interrupts are normally handled by OS 1300 in a manner that is proprietary and often not documented. Thus, the #VE handler in SD 1310' cannot rely on any kernel API. For example, the only thing that SD 1310' may do in its #VE handler may be limited to somehow passing the information from #VE Info to the kernel itself for the appropriate handling. Since #VEs have the same semantics as #PFs, converting #VEs to #PFs and passing them to the kernel is a possible solution. One difference between #VEs and #PFs is that when #VEs are generated, a processor in processing module 1204 does not push an error code onto the stack as done in case of #PFs. Also, since #VEs are described by four values instead of two in case of #PFs, control register CR2 is not used to write GLA. As described above, converting EPT violations to #PFs in the hypervisor proved not to be an effective solution. GLA→GPA mappings identified by the information provided in #PF error code (PFEC) and the CR2 register were valid as far as OS 1300 was concerned, and thus, such #PFs were ignored by OS 1300 as spurious. So converting a #VE into the corresponding #PF using the same GLA as reported in the #VE Info may also fail.

To resolve this issue, SD 1310' may employ a special FAULT_LA that it reserves for each enclave before ECREATE is executed. It may be, for example, a LA within the address space of application 1302' but is outside of the secure address space of secure resources 1304. Since this LA is not mapped to any VA or SP, access through it would normally cause a #PF. However, OS 1300 would not know how to handle the #PF and would pass it to application 1302' via SEH 1800. Since the CR2 control register is used to write FAULT_LA, a place to store the actual GLA is needed. Looking at SGX as an example, it turns out that the EDX register may not be available for use since it is typically used to pass arguments to some SGX instructions. Thus, SD 1310' may write the actual GLA that corresponds to the GPA that caused #VE to the EDX register. The last part may then be to deliver #PFs constructed in such a way to the #PF handler in the kernel. SD 1310' may then check the current value of IDTR in VECS 706, since it may have been changed by OS 1300 at some point, and reads the current address of the #PF handler by retrieving it from IDT pointed by IDTR. SD 1310' than jumps to that address.

FIG. 18 illustrates an example of how a #VE may be converted to a #PF and passed to OS kernel 1810, then to application 1302' and then back to SD 1310' (e.g., from SEH 1800 to page fault handler 1804) for addressing the exception. Initially, a #VE may be caused by device equipment 1812 (e.g., processing module 1206 and/or SPC 1306). The base address in vector 20 of VIDT 1802 points to the #VE handler in SD 1310'. The descriptor table access VM-exit handler and EPT views may be set up in hypervisor 710. When a #VE is generated by an attempt to access a PP having a mapping in LAM 1308' marked as not present, #VE handler 1806 in SD 1310' may be executed through VIDT 1802. #VE handler 706 may retrieve #VE Info VECS 1808, push the error code on the stack, write GLA into EDX, and write the special FAULT_LA for the enclave to which the faulting page belongs into EDX. SD 1310' then inspects VECS 1808 for the latest value of IDTR and retrieves the address of #PF handler 1812 in kernel 710 from IDT and transfers the control to #PF kernel 1812. #PF handler 1812 doesn't ignore the #PF since FAULT_LA is not mapped to any physical memory. However, it can't handle it either because the address was never mapped to any physical memory that may have been paged out. Kernel 1810 may then forward the fault to application 1302' through SEH 1800. The existing SEH 1800 in application 1302' would normally forward the fault to SD 210' by calling the #PF IOCTL. However, the faulting GLA has been stored located in EDX. The #PF IOCTL may then be changed so SEH 1800 can pass both values from the exception information structure provided by the kernel: the GLA from CR2 and the value from EDX. SD 1310' may then handle the fault, for example, by evicting a victim page and paging in the required target page while updating the EPT mappings for LAM 1308' accordingly.

Figure 19:
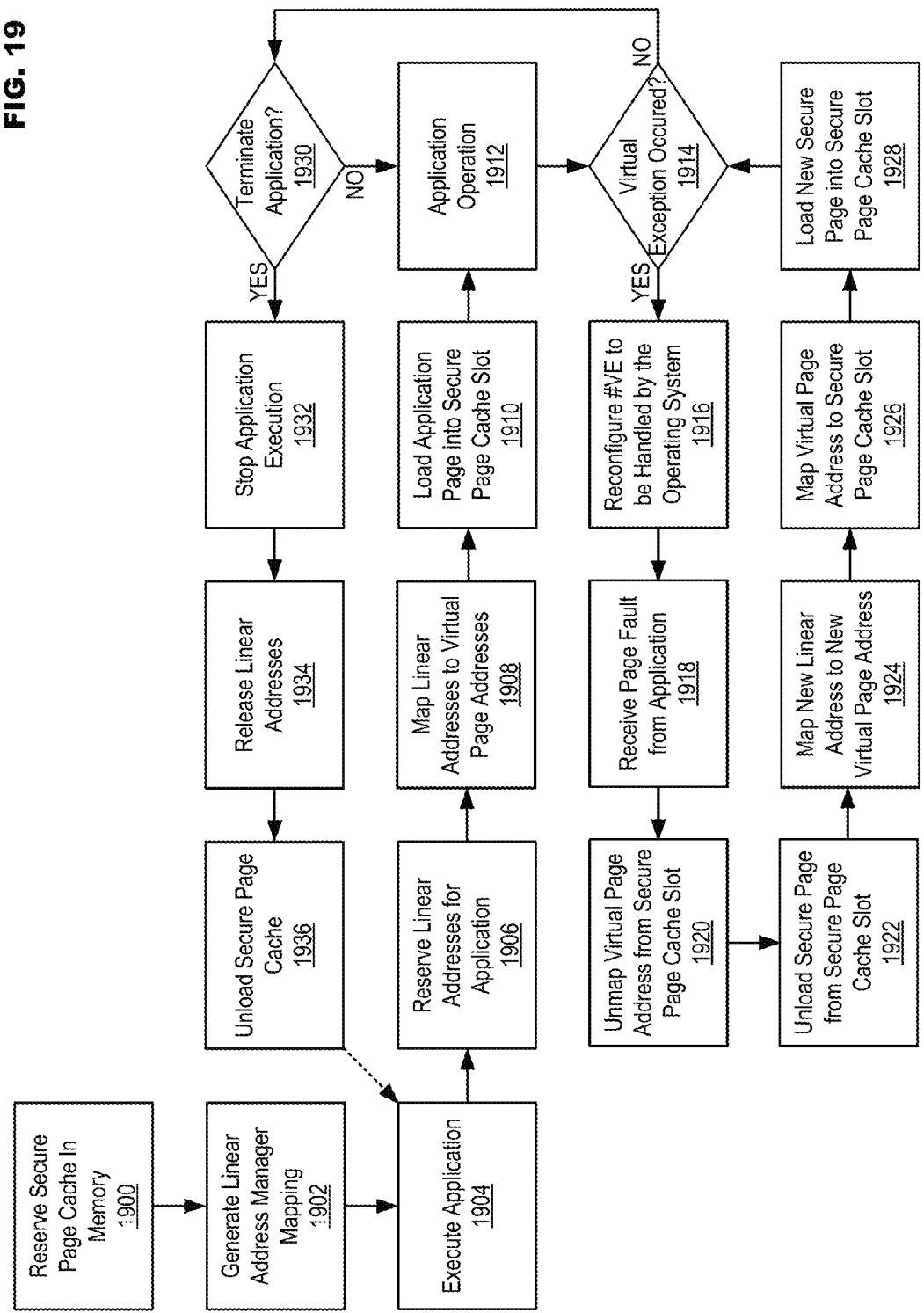
FIG. 19 illustrates example operations for employing intermediary structures for facilitating access to secure memory in accordance with at least one embodiment of the present disclosure.

FIG. 19 illustrates example operations for employing intermediary structures for facilitating access to secure memory in accordance with at least one embodiment of the present disclosure. The example operations disclosed in FIG. 19 may be from the perspective of a secure driver operating in a device. In operation 1900 a secure page cache may be reserved in memory (e.g., in a memory module of a device). A linear address manager mapping (e.g., mapping pseudo page addresses to secure page slots) may be generated in operation 1902, and may be followed by the execution of an application in operation 1904. In operation 1906 linear addresses in an application page table may be reserved, and may be mapped to corresponding pseudo page addresses in the linear address manager in operation 1908. Application pages may then be loaded into secure page cache slots in operation 1910, the application pages becoming secure pages upon loading.

The application may begin normal operation in operation 1912. A determination may then be made in operation 1914 as to whether a virtual exception has occurred. If it is determined in operation 1914 that a virtual exception has occurred, then in operation 1916 the virtual exception may be reconfigured for handling by the operating system. In operation 1918 a page fault (e.g., corresponding to the virtual exception) may be received from the application, triggering the secure driver to begin operations to resolve the problem (e.g., to evict a victim secure page from the secure page cache and to load a target application page in the slot of the evicted victim page). These operations may include, for example, unmapping at least one pseudo page address from a secure page cache slot (e.g., corresponding to the victim page) in operation 1920. In operation 1922 the victim page may be unloaded from its secure page cache slot, followed by mapping a new linear address (e.g., corresponding to the target page to be loaded) to a new pseudo page address in operation 1924. The new pseudo page address may then be mapped to the available secure page cache slot in operation 1926, and a new application page (corresponding to the linear address mapped in operation 1924) may be loaded into the available secure page cache slot in operation 1928. Operation 828 may be followed by operation 1914 to detect further exceptions.

If in operation 1914 it is determined that a virtual exception has not occurred, then the application may continue normal operation in operation 1930 until a determination is made in operation 1930 that the application is ready to (e.g., or needs to) terminate. In operation 1932 the application may stop execution. The linear addresses associated with the application may be released in operation 1934, followed by the secure page cache being unloaded from memory in operation 1936. Operation 1936 may optionally be followed by a return to operation 1904 wherein a new application may be loaded. Operations 1906-1936 may then proceed as previously described.

While FIG. 19 illustrates operations according to an embodiment, it is to be understood that not all of the operations depicted in FIG. 19 are necessary for other embodiments. Indeed, it is fully contemplated herein that in other embodiments of the present disclosure, the operations depicted in FIG. 19, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions.

Other embodiments may be implemented as software modules executed by a programmable control device.

Thus, the present application is directed to employing intermediary structures for facilitating access to secure memory. A secure driver (SD) may be loaded into the device to reserve a least a section of memory in the device as a secure page cache (SPC). The SPC may protect application data from being accessed by other active applications in the device. Potential race conditions may be avoided through the use of a linear address manager (LAM) that maps linear addresses (LAs) in an application page table (PT) to page slots in the SPC. The SD may also facilitate error handling in the device by reconfiguring VEs that would otherwise be ignored by the OS.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for employing intermediary structures for facilitating access to secure memory, as provided below.

According to example 1 there is provided a device configured to employ intermediary structures for facilitating access to secure memory. The device may comprise a processing module and a memory module, including at least a firmware module to cause a secure driver to be loaded into the memory module, the secure driver being to cause at least one section of memory in the memory module to be reserved as a secure page cache including at least one secure page slot and generate a linear address manager mapping at least one pseudo page address in the linear address manager to the at least one secure page slot.

Example 2 may include the elements of example 1, wherein the memory module further includes an operating system in which applications execute, the execution of at least one application in the operating system causing data to be loaded into the secure page cache from elsewhere in the memory module.

Example 3 may include the elements of example 2, wherein the application comprises at least one page table including at least one linear address reserved by the secure driver for mapping to the at least one pseudo page address in the linear address manager.

Example 4 may include the elements of example 3, wherein the secure driver is further to release a linear address reserved by the secure driver for reassignment, map the linear address to a pseudo page address in the linear address manager and load an application page from the application into a secure page slot mapped to the pseudo page address, the application page becoming a secure page upon loading.

Example 5 may include the elements of example 4, wherein the secure driver is further to determine that a secure page loaded in a secure page slot is to be evicted from the secure page cache based at least on the receipt of a page fault, cause a pseudo page address corresponding to the secure page to be unmapped from the secure page slot in which the secure page is loaded and cause the secure page to be unloaded from the secure page slot.

Example 6 may include the elements of example 5, wherein the secure driver is further to cause a new application page to be loaded into the secure page slot, cause a new pseudo page address to be mapped to the secure page slot and cause a new linear address to be mapped to the new pseudo page address.

Example 7 may include the elements of example 4, wherein the secure driver is further to determine that a secure page loaded in a secure page slot is to be evicted from the secure page cache based at least on the receipt of a page fault, cause a pseudo page address corresponding to the secure page to be unmapped from the secure page slot in which the secure page is loaded, cause the secure page to be unloaded from the secure page slot, cause a new application page to be loaded into the secure page slot, cause a new pseudo page address to be mapped to the secure page slot and cause a new linear address to be mapped to the new pseudo page address.

Example 8 may include the elements of example 7, wherein the linear address manager is at least to avoid a race condition wherein a reserved linear address is reassigned to another program thread when a secure page is evicted from the secure page cache.

Example 9 may include the elements of any of examples 1 to 8, wherein the secure driver is further to receive a virtual exception due to a page fault occurring in the secure page cache, reconfigure the virtual exception to be handled by the operating system and provide the reconfigured virtual exception to an operating system kernel.

Example 10 may include the elements of example 9, wherein the secure driver being to reconfigure the virtual exception comprises the secure driver being to push an error code on to an operating system call stack and write a linear address indicating that the virtual exception has occurred to a control register of the processing module to cause an operating system error handler to react to the virtual exception, the linear address indicating the virtual exception being within an address space of an application that caused the exception and outside of a secure address space within the memory module.

Example 11 may include the elements of example 10, wherein the secure driver is further to write a linear address that caused the virtual exception to a register in the secure address space.

Example 12 may include the elements of example 9, wherein the secure driver being to reconfigure the virtual exception comprises the secure driver being to push an error code on to an operating system call stack, write a linear address indicating that the virtual exception has occurred to a control register of the processing module to cause an operating system error handler to react to the virtual exception, the linear address indicating the virtual exception being within an address space of an application that caused the exception and outside of a secure address space within the memory module and write a linear address that caused the virtual exception to a register in the secure address space.

Example 13 may include the elements of example 12, wherein the secure driver is further to receive a page fault from a structured error handler in an application and resolve the virtual exception based on the reception of the page fault.

Example 14 may include the elements of any of examples 1 to 8, wherein the secure driver is a Secure Guard Extensions (SGX) driver and the secure page cache is an SGX enclave page cache.

According to example 15 there is provided a method for employing intermediary structures for facilitating access to secure memory. The method may comprise causing at least one section of memory to be reserved as a secure page cache including at least one secure page slot and generating a linear address manager mapping at least one pseudo page address in the linear address manager to the at least one secure page slot.

Example 16 may include the elements of example 15, and may further comprise executing an application including at least one page table having at least one linear address reserved for mapping to the at least one pseudo page address in the linear address manager and causing data to be loaded into the secure page cache from elsewhere in memory based on executing the application.

Example 17 may include the elements of example 16, wherein causing data to be loaded into the secure page cache comprises releasing a reserved linear address for reassignment, mapping the linear address to a pseudo page address in the linear address manager and loading an application page from the application into a secure page slot mapped to the pseudo page address, the application page becoming a secure page upon loading.

Example 18 may include the elements of example 17, and may further comprise determining that a secure page loaded in a secure page slot is to be evicted from the secure page cache based at least on the receipt of a page fault, causing a pseudo page address corresponding to the secure page to be unmapped from the secure page slot in which the secure page is loaded; and causing the secure page to be unloaded from the secure page slot.

Example 19 may include the elements of example 18, and may further comprise causing a new application page to be loaded into the secure page slot, causing a new pseudo page address to be mapped to the secure page slot and causing new linear address to be mapped to the new pseudo page address.

Example 20 may include the elements of example 17, and may further comprise determining that a secure page loaded in a secure page slot is to be evicted from the secure page cache based at least on the receipt of a page fault, causing a pseudo page address corresponding to the secure page to be unmapped from the secure page slot in which the secure page is loaded, causing the secure page to be unloaded from the secure page slot, causing a new application page to be loaded into the secure page slot, causing a new pseudo page address to be mapped to the secure page slot and causing new linear address to be mapped to the new pseudo page address.

Example 21 may include the elements of example 20, wherein the linear address manager is at least to avoid a race condition wherein a reserved linear address is reassigned to another program thread when a secure page is evicted from the secure page cache.

Example 22 may include the elements of any of examples 15 to 21, and may further comprise receiving a virtual exception due to a page fault occurring in the secure page cache, reconfiguring the virtual exception to be handled by the operating system and providing the reconfigured virtual exception to an operating system kernel.

Example 23 may include the elements of example 22, wherein reconfiguring the virtual exception comprises pushing an error code on to an operating system call stack and writing a linear address indicating that the virtual exception has occurred to a control register of a processing module to cause an operating system error handler to react to the virtual exception, the linear address indicating the virtual exception being within an address space of an application that caused the exception and outside of a secure address space within the memory module.

Example 24 may include the elements of example 23, and may further comprise writing a linear address that caused the virtual exception to a register in the secure address space.

Example 25 may include the elements of example 22, wherein reconfiguring the virtual exception may comprise pushing an error code on to an operating system call stack, writing a linear address indicating that the virtual exception has occurred to a control register of a processing module to cause an operating system error handler to react to the virtual exception, the linear address indicating the virtual exception being within an address space of an application that caused the exception and outside of a secure address space within the memory module and writing a linear address that caused the virtual exception to a register in the secure address space.

Example 26 may include the elements of example 25, and may further comprise receiving a page fault from a structured error handler in an application and resolving the virtual exception based on the reception of the page fault.

Example 27 may include the elements of any of examples 15 to 21, wherein the secure page cache is a Secure Guard Extensions (SGX) enclave page cache.

According to example 28 there is provided a system including at least a device, the system being arranged to perform the method of any of the above examples 15 to 27.

According to example 29 there is provided a chipset arranged to perform the method of any of the above examples 15 to 27.

According to example 30 there is provided at least one machine readable medium comprising a plurality of instructions that, in response to be being executed on a computing device, cause the computing device to carry out the method according to any of the above examples 15 to 27.

According to example 31 there is provided a device configured for employing intermediary structures for facilitating access to secure memory, the device being arranged to perform the method of any of the above examples 15 to 27.

According to example 32 there is provided a system for employing intermediary structures for facilitating access to secure memory. The system may comprise means for causing at least one section of memory to be reserved as a secure page cache including at least one secure page slot and means for generating a linear address manager mapping at least one pseudo page address in the linear address manager to the at least one secure page slot.

Example 33 may include the elements of example 32, and may further comprise means for executing an application including at least one page table having at least one linear address reserved for mapping to the at least one pseudo page address in the linear address manager and means for causing data to be loaded into the secure page cache from elsewhere in memory based on executing the application.

Example 34 may include the elements of example 33, wherein the means for causing data to be loaded into the secure page cache may comprise means for releasing a reserved linear address reserved for reassignment, means for mapping the linear address to a pseudo page address in the linear address manager and means for loading an application page from the application into a secure page slot mapped to the pseudo page address, the application page becoming a secure page upon loading.

Example 35 may include the elements of example 34, and may further comprise means for determining that a secure page loaded in a secure page slot is to be evicted from the secure page cache based at least on the receipt of a page fault, means for causing a pseudo page address corresponding to the secure page to be unmapped from the secure page slot in which the secure page is loaded and means for causing the secure page to be unloaded from the secure page slot.

Example 36 may include the elements of example 35, and may further comprise means for causing a new application page to be loaded into the secure page slot, means for causing a new pseudo page address to be mapped to the secure page slot and means for causing new linear address to be mapped to the new pseudo page address.

Example 37 may include the elements of any of examples 31 to 36, and may further comprise means for receiving a virtual exception due to a page fault occurring in the secure page cache, means for reconfiguring the virtual exception to be handled by the operating system and means for providing the reconfigured virtual exception to an operating system kernel.

Example 38 may include the elements of example 37, wherein the means for reconfiguring the virtual exception may comprise means for pushing an error code on to an operating system call stack and means for writing a linear address indicating that the virtual exception has occurred to a control register of a processing module to cause an operating system error handler to react to the virtual exception, the linear address indicating the virtual exception being within an address space of an application that caused the exception and outside of a secure address space within the memory module.

Example 39 may include the elements of example 38, and may further comprise means for writing a linear address that caused a virtual exception to a register in the secure address space.

Example 40 may include the elements of any of examples 31 to 36, wherein the secure page cache is a Secure Guard Extensions (SGX) enclave page cache.

Method and Apparatus to Allow Secure Guest Access to Extended Page Tables

The embodiments of the invention described below are the result of an attempt to address two issues related to some of the implementations discussed above. Certain virtual technology (VT) extensions allow a VMX root mode hypervisor to create memory views using extended page tables (EPTs) and store the addresses of the page map level 4 (PML4) pages of those views, called EPT pointers, in an EPT pointer (EPTP) List page. The guest can then request (via the VMFUNC 0 instruction leaf in one embodiment) to change the current memory view by selecting a PML4 from the EPTP List.

If any changes to the EPTs describing a particular memory view are required, these are either performed by the hypervisor 1810 after the guest executes a VMCALL passing a pointer to some data structure that defines which view should be changed. Alternatively, the hypervisor could map the EPTs that describe the view into the guest's memory space to allow the guest to make those changes. Any stale EPT mappings would still have to be invalidated by the hypervisor 1810 since INVEPT is a VMX root mode instruction. Thus, the guest would still have to execute a VMCALL passing a pointer to some data structure that defines which mapping should be invalidated.

Exposing EPTs to the guest in a multi-guest system poses seemingly insurmountable security challenges. For example, it would be difficult to protect the other guests in the system and the hypervisor from the guest that has been permitted to manipulate the EPT mappings. In addition, it would be desirable to make invalidating EPT mappings as efficient as possible without resorting to a VMCALL or ASID rotation technique.

The embodiments of the invention described below introduce techniques (e.g., such as a new VMFUNC leaf) that allows a guest to request that an EPT mapping be changed in a certain way and/or invalidated according to a set of rules described in a special table, referred to herein as an EPT Edit Table (or EPT_EDIT_TBL). In one embodiment, the EPT edit table may be set up by the VMX root mode hypervisor and can contain up to 8 entries. This is only one possibility assuming eight 8-byte fields per entry in a 4 kB page. If each entry is made smaller, more entries could added to the table and the entry # in ECX would use more bits. In one embodiment of the invention, each entry is composed of the address of the first leaf (last level) EPT page that contains guest physical address (GPA)->host physical address (HPA) mappings, the GPA start and size, and the HPA start and size together with allowable access permissions. In one embodiment, 4 k page mappings are used and leaf EPT pages must reside in contiguous physical memory to avoid EPT walks.

In one embodiment, the guest executes a new VMFUNC leaf by passing the following arguments:

EAX=1 (new VMFUNC leaf #)

ECX=entry from the EPT_EDIT_TBL in bits 5:0; RWX (read write execute) access in bits 31:29; invalidate directive in bit 8

EBX=page from GPA space

EDX=page from HPA space In one embodiment, the guest learns about the existence and contents of EPT_EDIT_TBL through a new CPUID leaf.

Figure 20:
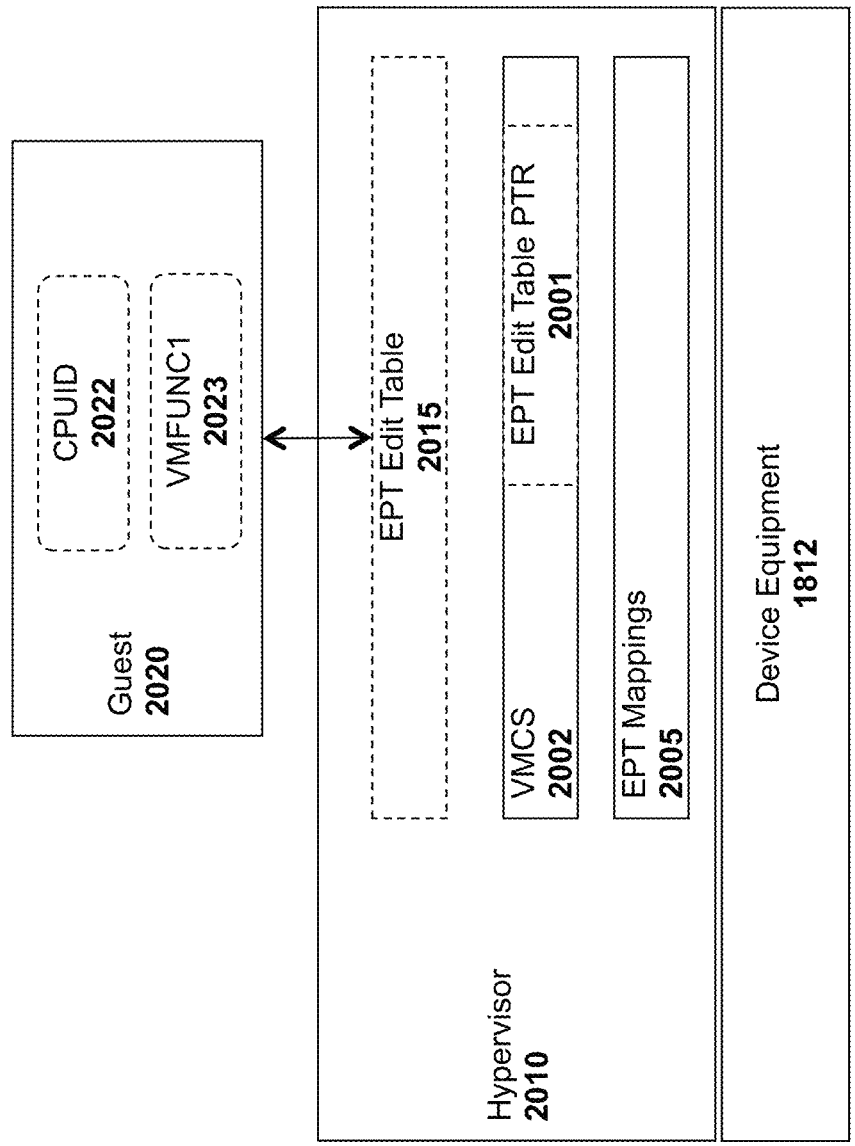
FIG. 20 illustrates one embodiment of the invention in which a hypervisor manages an extended page table (EPT) edit table.

One embodiment of the invention will be described with respect to FIG. 20 which illustrates a hypervisor 2010 executed on device equipment 1812 (e.g., a computing platform comprising system memory, one or more processors, a mass storage subsystem, etc). The hypervisor exposes a virtualized execution environment for one or more guest systems 2020 (e.g., guest operating systems and/or applications).

As described above, in one embodiment, the hypervisor creates EPT mappings 2005 between the GPA space used by the guest 2020 and the HPA space used by the hypervisor 2010. In one embodiment, it performs the mappings 2005 to keep leaf (last-level) EPTs in contiguous physical memory. Thus, in one embodiment, the mappings 2005 are created are for 4 kB pages only.

Instead of exposing these leaf EPTs directly to the guest 2020, one embodiment of the hypervisor 2010 creates an EPT edit table 2015 (EPT_EDIT_TBL) and populates it with the information about the newly created GPA→HPA mappings 2005. In one embodiment, the hypervisor 2010 also enables a virtual machine function, VMFUNC1 2023, using the "enable VM functions" VM-execution control. A specific VM function is enabled by setting the corresponding VM-function control. In one embodiment, the corresponding VM-function control is enabled in the virtual machine control structure (VMCS) 2002, which, as mentioned above, is a data structure managed by the hypervisor 2010 for each guest 2020.

In one embodiment, the guest 2020 learns about the EPT edit table 2015 via a new CPUID leaf 2022 that returns the start and size of the GPA space and the start and the size of the HPA space, to which the GPA space can be mapped together with the entry index of such mapping in the EPT edit table 2015. Then, the guest 2020 executes the VMFUNC1 function 2023 to map a 4 kB page in the GPA space to a 4 kB page in the HPA space by passing the EPT edit table (EPT_EDIT_TBL) entry index, GPA, HPA and access permissions. The VMFUNC1 function also allows the guest 2020 to invalidate stale EPT mappings 2005.

As described above, the only existing secure alternative to allow the guest 2020 to manipulate EPT mappings 2005 is through the VMCALL instruction in a proprietary way defined by the hypervisor 2010. However, executing the VMCALL instruction frequently leads to a significant performance cost.

In one embodiment, the hypervisor 2010 allocates one 4 kB page per guest 2020. The address of that page is stored in a VMCS 2002 field called the EPT edit table pointer 2001 (EPT_EDIT_TBL_PTR). The hypervisor allocates GPA space that is initially not mapped to any HPA space. In one embodiment, the GPA space is allocated by creating EPTs.

Figure 21:
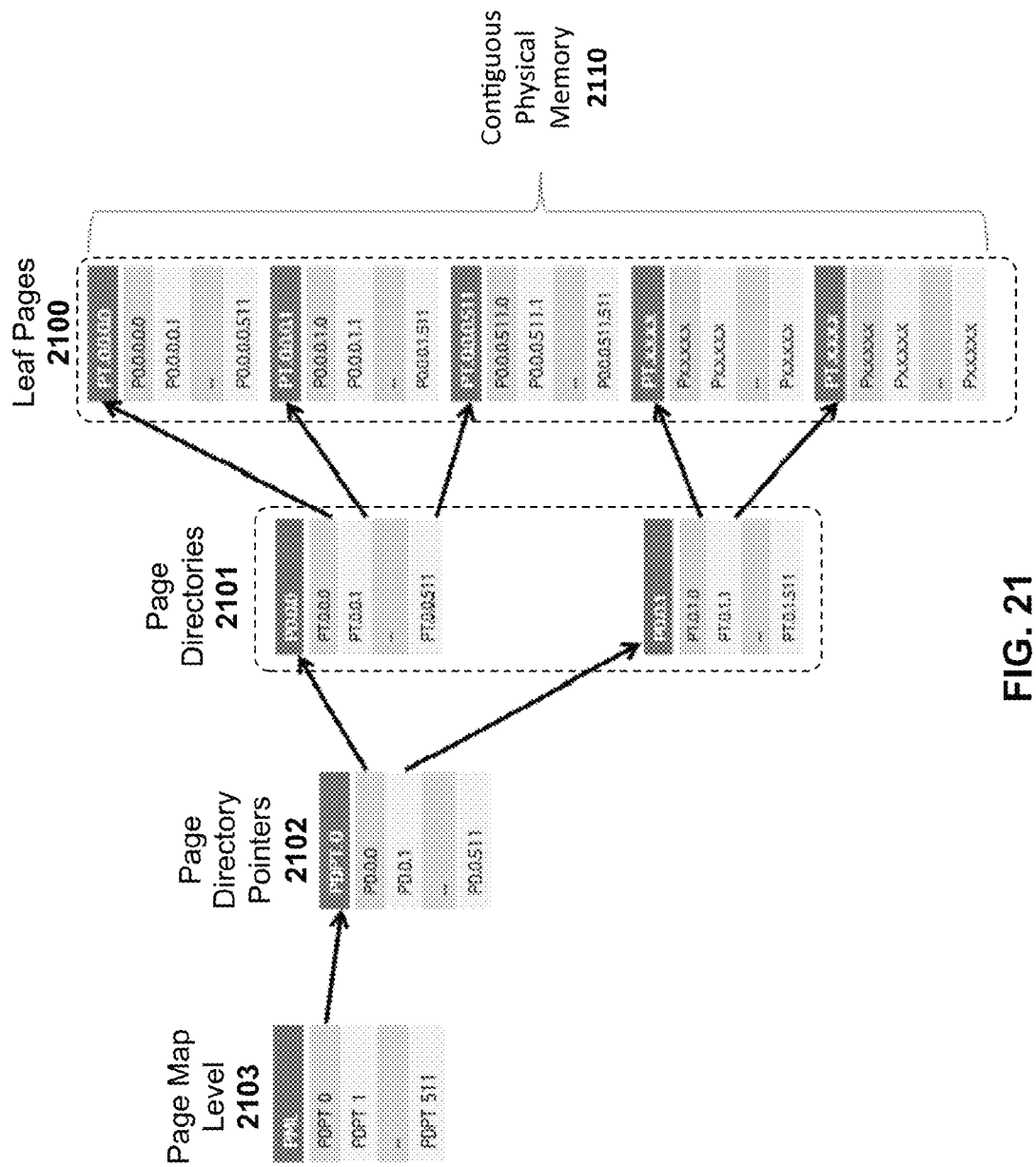
FIG. 21 illustrates how leaf pages for EPTs may be allocated to occupy a contiguous physical memory region.

As illustrated in FIG. 21, in one embodiment, the leaf pages 2100 for these EPTs are allocated in such a way as to occupy a contiguous physical memory region 2110. In particular, the illustrated implementation may use an Intel 64 paging mode which maps a 64-bit virtual address to a physical address through a four-level hierarchical paging structure (although the actual number of bits supported in the virtual or physical address spaces may be implementation-dependent). This particular implementation includes a page map level (PML) 2103 page vector and a page directory pointer (PDP) 2102 page vector to track the additional page tables used in the Intel 64 paging structure. For example, each entry in a PML 2103 may reference a PDP 2102 and each entry in the PDP 2102 may reference a page directory 2101 having page directory entries (PDEs) which, in turn, may reference a leaf page table entry 2100.

An exemplary EPT edit table 2015 is illustrated in FIG. 22. As illustrated, in one embodiment, the hypervisor 2010 populates the EPT edit table 2015 by storing the address of the first leaf EPT 2201, the number of leaf EPTs 2202, the address of the first GPA space page 2203, the number of GPA space pages 2204, the address of the first HPA space page 2205, the number of HPA space pages 2206, and the access permissions 2207. In one embodiment, one 8-byte field 2208 remains reserved.

The one exemplary entry shown in FIG. 22 allows the guest 2020 to map the GPA space between address 0x20000000 and 0x9FFFFFFF to the HPA space between address 0x4000000 and 0x43FFFFF with read/write/execute (RWX) permissions specified in 2207. Note that the GPA space in this example is expressed as the number of 4 kB pages (1024 in the example). A simple check may be performed to determine whether the leaf EPT size and GPA space size are correct. It takes one leaf page to map 512 GPA space pages. In the illustrated example, there are 0x80000 GPA space pages, which require 0x80000/512=1024 leaf EPT pages. This check can be performed by microcode whenever VMFUNC.(EAX=1) is executed.

In one embodiment, the guest 2020 discovers the contents of the EPT edit table 2015 by executing a new leaf of CPUID 2022 (e.g., EAX=13H) in a manner similar to how software executes CPUID.(EAX=12H) to enumerate EPC sections with one important difference. Since the EPT edit table 2015 contains two sets of addresses and sizes, one instance of CPUID (e.g., CPUID.(EAX=13H, ECX=0-7)) will return GPA spaces and another instance of CPUID (e.g., CPUID.(EAX=13H, ECX=8-15)) will return HPA spaces. In addition, in a similar manner in which EPC sections are enumerated, bit 0 in EAX and ECX indicates whether GPA/HPA space is valid. Finally, the access permission bits may be returned in bits 31:29 in EDX for HPA spaces.

In one embodiment, the guest 2020 then executes VMFUNC.(EAX=1, ECX=x, EBX=y, EDX=z) to map a GPA space page to an HPA space page as follows:

x[31:29]=access permissions; x[8]=invalidate directive; x[53:0]=entry in the EPT edit table 2015 y=page number in the GPA space defined by x[5:0]

z=page number in the HPA space defined by x[5:0]

In one embodiment, the processor hardware (e.g., microcode) uses the following process to edit leaf EPTs as specified by the CPUID instruction above. Note that this pseudocode is only an approximation of what microcode may have to do and what other checks may have to be performed. However, the basic idea is that with all requirements placed on the format of the EPT edit table and leaf EPTs, the instruction should have a relatively simple flow.

```
IF x[5:0] >= 8
    THEN VM exit;
ELSE
    tent_ENTRY ← 64 bytes from VMCS. EPT_EDIT_TBL_PTR +
    ECX[5:0] * 64;
    IF tent_ENTRY is not a valid EPT_EDIT_TBL entry
        THEN VM exit;
    ELSE
        IF y >= tent_ENTRY[3] or z >= tent_ENTRY[5] or
        x[31:29] more permissive then tent_ENTRY[6]
            THEN VM exit;
        ELSE
            write (tent_ENTRY[4] + z << 12)((N−
            1):12) to tent_ENTRY[0][y] ((N−
            1):12)
            write x[31:29] to tent_ENTRY[0][y] (2:0)
            IF x[8] == 1
                THEN
                    execute INVEPT ucode
                    flow
            Fl;
        Fl;
    Fl;
Fl;
```

The pseudo code above assumes that tent_ENTRY is an array with eight 8-byte fields. Also, the expression tent_ENTRY[0][y] points to 8-byte entry in leaf EPT tables 2100. On multi-core systems, when a mapping invalidation is needed, the software may execute VMFUNC.(ECX[8]=1) on all cores. In one embodiment, for performance reasons, the new VMFUNC leaf provides a way to simply execute INVEPT microcode flow without changing the mapping again.

The embodiments of the invention described above allow a guest to request that an EPT mapping be changed in a certain way and/or invalidated according to a set of rules described in a special table. The described techniques allow the guest to modify and invalidate EPT mappings very efficiently, without resorting to a VMCALL or ASID rotation technique. Moreover, the described techniques may be implemented while maintaining a high level of security.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
    a hypervisor to create extended page table (EPT) mappings between a guest physical address (GPA) space and a host physical address (HPA) space;
    the hypervisor to create an EPT edit table and to populate the EPT edit table with information related to permitted mappings between the GPA space and HPA space;
    a guest to read the EPT edit table to determine the information related to the permitted mappings between the GPA space and HPA space, the guest to use the information to map one or more pages in the GPA space to one or more pages in the HPA space.

2. The apparatus as in claim 1 wherein, when performing the EPT mappings, the hypervisor is to maintain leaf EPTs in a contiguous physical memory region.

3. The apparatus as in claim 1 wherein to determine the information related to the permitted mappings between the GPA space and the HPA space within the EPT edit table, the guest is to execute a CPUID instruction.

4. The apparatus as in claim 3 wherein to use the information to map one or more pages in the GPA space to one or more pages in the HPA space, the guest is to execute a VMFUNC instruction.

5. The apparatus as in claim 1 wherein the information related to the permitted mappings between the GPA space and HPA space determined from the EPT edit table comprises a start and size of the GPA space and a start and the size of the HPA space.

6. The apparatus as in claim 1 wherein the EPT edit table comprises a plurality of entries, each entry including one or more of: a leaf EPT start address, a leaf EPT size, a GPA start space, a GPA size, an HPA start address, an HPA size, and access permissions.

7. The apparatus as in claim 6 wherein the access permissions comprise read, write and execute permissions.

8. The apparatus as in claim 1 further comprising:
    a virtual machine control structure (VMCS) to store control data related to the guest.

9. The apparatus as in claim 8 wherein the hypervisor is to store an EPT edit table pointer within the VMCS comprising an address of a page allocated to the guest by the hypervisor.

10. The apparatus as in claim 9 wherein the page comprises a 4 kB page.

11. The apparatus as in claim 1 wherein the guest executes an instruction using registers EAX=1, ECX=x, EBX=y, and EDX=z to map a GPA space page to an HPA space page, where at least a portion of x identifies an entry in the EPT edit table, at least a portion of y indicates a page number in the GPA space, and at least a portion of z indicates a page number in the HPA space.

12. The apparatus as in claim 11 wherein at least a portion of x further indicates access permissions.

13. A method comprising:
    creating extended page table (EPT) mappings between a guest physical address (GPA) space and a host physical address (HPA) space;

creating an EPT edit table and populating the EPT edit table with information related to permitted mappings between the GPA space and HPA space;

reading by a guest the EPT edit table to determine the information related to the permitted mappings between the GPA space and HPA space, using the information by the guest to map one or more pages in the GPA space to one or more pages in the HPA space.

14. The method as in claim 13 further comprising keeping leaf EPTs in a contiguous physical memory region when creating the EPT mappings.

15. The method as in claim 13 wherein to determine the information related to the permitted mappings between the GPA space and the HPA space within the EPT edit table, the guest is to execute a CPUID instruction.

16. The method as in claim 15 wherein to use the information to map one or more pages in the GPA space to one or more pages in the HPA space, the guest is to execute a VMFUNC instruction.

17. The method as in claim 13 wherein the information related to the permitted mappings between the GPA space and HPA space determined from the EPT edit table comprises a start and size of the GPA space and a start and the size of the HPA space.

18. The method as in claim 13 wherein the EPT edit table comprises a plurality of entries, each entry including one or more of: a leaf EPT start address, a leaf EPT size, a GPA start space, a GPA size, an HPA start address, an HPA size, and access permissions.

19. The method as in claim 18 wherein the access permissions comprise read, write and execute permissions.

20. The method as in claim 13 further comprising:
storing control data related to the guest in a virtual machine control structure (VMCS).

21. The method as in claim 20 wherein the control data includes an EPT edit table pointer comprising an address of a page allocated to the guest.

22. The method as in claim 21 wherein the page comprises a 4 kB page.

23. The method as in claim 13 wherein the guest executes an instruction using registers EAX=1, ECX=x, EBX=y, and EDX=z to map a GPA space page to an HPA space page, where at least a portion of x identifies an entry in the EPT edit table, at least a portion of y indicates a page number in the GPA space, and at least a portion of z indicates a page number in the HPA space.

24. The method as in claim 23 wherein at least a portion of x further indicates access permissions.

* * * * *